United States Patent
Morimoto

(10) Patent No.: US 8,310,744 B2
(45) Date of Patent: Nov. 13, 2012

(54) IMAGE PROCESSING APPARATUS, IMAGE FORMING APPARATUS, IMAGE PROCESSING METHOD, AND STORAGE MEDIUM

(75) Inventor: Atsuhisa Morimoto, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 814 days.

(21) Appl. No.: 12/489,126

(22) Filed: Jun. 22, 2009

(65) Prior Publication Data

US 2009/0316235 A1    Dec. 24, 2009

(30) Foreign Application Priority Data

Jun. 23, 2008 (JP) ................................. 2008-163722

(51) Int. Cl.
*G03F 3/10* (2006.01)
(52) U.S. Cl. ....... 358/527; 358/448; 358/488; 358/1.18; 715/274; 345/649
(58) Field of Classification Search .................. 358/448, 358/452, 474, 488, 505, 527, 531, 537, 1.18; 382/182; 345/649; 715/274
See application file for complete search history.

(56) References Cited

U.S. PATENT DOCUMENTS

| | | | |
|---|---|---|---|
| 7,643,187 B2 * | 1/2010 | Tagawa | 358/527 |
| 7,852,520 B2 * | 12/2010 | Iida | 358/474 |
| 2004/0252318 A1 * | 12/2004 | Kuroda et al. | 358/1.12 |
| 2007/0157084 A1 | 7/2007 | Yano et al. | |
| 2007/0216973 A1 * | 9/2007 | Tagawa | 358/527 |
| 2007/0297010 A1 * | 12/2007 | Kotani et al. | 358/1.18 |
| 2012/0105918 A1 * | 5/2012 | Fan et al. | 358/462 |

FOREIGN PATENT DOCUMENTS

| | | |
|---|---|---|
| JP | 6-189083 A | 7/1994 |
| JP | 2004-56782 A | 2/2004 |
| JP | 2005/269524 A | 9/2005 |

OTHER PUBLICATIONS

"Viewer with which a user can view images by touch operation (iPhone, for example) /S2V" [On Line], Willcom Fansite, Search Date; May 23, 2008, Internet <URL : http://www.willcom-fan.com/wzero3/entries/memnOck/000431>.

* cited by examiner

*Primary Examiner* — Kimberly A Williams
(74) *Attorney, Agent, or Firm* — Birch, Stewart, Kolasch & Birch, LLP

(57) ABSTRACT

An image processing apparatus includes a document correction section and a display control section. The document correction section carries out rotation processing with respect to a document image so that a first reference direction from a reference side of a document to a side facing the reference side coincides with as an upper-to-lower direction of the document image which has been subjected to the rotation processing. Further, before the rotation processing is carried out, the display control section causes the display apparatus to display a display image in which the document and a mark indicating the reference side of the document to a user are shown in accordance with the document image. This allows a user to easily predict how the document shown in the document image will be oriented after the document image is subjected to the rotation processing, before the user inputs a command to carry out the rotation processing.

10 Claims, 19 Drawing Sheets

IMAGE PROCESSING APPARATUS, IMAGE FORMING APPARATUS, IMAGE PROCESSING METHOD, AND STORAGE MEDIUM

This Nonprovisional application claims priority under 35 U.S.C. §119(a) on Patent Application No. 2008-163722 filed in Japan on Jun. 23, 2008, the entire contents of which are hereby incorporated by reference.

TECHNICAL FIELD

The present invention relates to an image processing apparatus for displaying a thumbnail or a preview of a target image.

BACKGROUND ART

Before a document image is printed out, a user often causes an image forming apparatus, such as a copying machine and a multifunction printer, to print-preview the document image that has been image-processed in accordance with a processing condition set by the user. In a case where a plurality of documents are read, each of the documents may be print-previewed one by one, or the plurality of documents may be print-previewed collectively. The processing condition includes: a sort of a document; a print density; a ratio in enlarging/reducing processing; single-sided printing or two-sided printing; a binding margin size; and the like.

For example, Patent Literature 1 described below discloses an image forming apparatus which (i) print-previews an inputted document image, and also (ii) displays a checking icon with which a user can check whether or not a page orientation of the document is correct. Specifically, this checking icon is an icon for accepting a command to carry out rotation processing and a setting of a rotation angle. Settable rotation angles are 0°, 90°, 180°, and 270°. Further, in the image forming apparatus disclosed in Patent Literature 1, a rotation direction is a clockwise direction. If a user wants to rotate a document image at a right angle, the user sets the rotation angle at 90°, and if the user does not want to rotate the document image, the user sets the rotation angle at 0°.

Patent Literature 1 discloses that when receiving a command to carry out the rotation processing from a user, the image forming apparatus carries out the rotation processing with respect to a document image, and then print-previews again the document image that has been subjected to the rotation processing, before the document image is printed out. Further, Patent Literature 1 discloses that the image forming apparatus (i) determines the page orientation of the inputted document image, (ii) carrying out the rotation processing based on the determined page orientation, and (iii) print-previews the rotation-processed document image. Furthermore, Patent Literature 1 discloses that the image forming apparatus print-previews a image in which a plurality of document images are shown collectively, and carries out the rotation processing collectively with respect to the plurality of document images.

CITATION LIST

Patent Literature 1
Japanese Patent Application Publication, Tokukai, No. 2007-200280 A (Publication Date: Aug. 9, 2007)
Patent Literature 2
Japanese Patent Application Publication, Tokukaihei, No. 06-189083 A (Publication Date: Jul. 8, 1994)

Non Patent Literature 1
"Viewer with which a user can view images by touch operation (iPhone, for example)/S2V", [On Line], Willcom Fansite, Search Date: May 23, 2008, Internet <URL:http://www.willcom-fan.com/wzero3/entries/memn0ck/000431/>

However, according to the image forming apparatus disclosed in Patent Literature 1, although the rotation direction of the rotation processing is the clockwise direction, the rotation direction is not shown to a user on a display screen. Therefore, in a case where the rotation angle is merely set by a user, there is a risk that the rotation processing causes a page orientation of a document to be a wrong orientation that is not intended by a user.

SUMMARY OF INVENTION

An object of the present invention is to provide an image processing apparatus with which a user can easily predict how a document shown in a document image will be oriented after the document image is subjected to rotation processing, before the user inputs a command to carry out the rotation processing.

In order to attain the object, an image processing apparatus of the present invention includes: a rotation processing section for carrying out rotation processing with respect to a document image, in which a document is shown, so that a first reference direction from a reference side of the document to a side facing the reference side coincides with a second reference direction of the document image which has been subjected to the rotation processing; a top-to-bottom direction determining section for determining a top-to-bottom direction from a top side of the document shown in the document image to a lower side of the document; and a display control section for causing a display apparatus to display, before the rotation processing is carried out, a display image in which (i) the document, (ii) a mark indicating the reference side to a user, and (iii) a selection button for the user to select a target document to be subjected to the rotation processing are shown in accordance with the document image, the top-to-bottom direction determining section determining each top-to-bottom direction of a plurality of document images in a case of receiving data including the plurality of document images in which respective documents are shown, the display control section causing, for a combination of ones of the plurality of document images whose top-to-bottom directions coincide with each other, the display apparatus to display, as the display image, an image in which (i) each of the respective documents shown in said ones of the plurality of document images and (ii) a mark indicating each reference side of the respective documents to the user are shown, the rotation processing section carrying out collectively rotation processing with respect to ones of the plurality of document images in which respective documents selected as target documents are shown, in response to a command to carry out rotation processing.

Additional objects, features, and strengths of the present invention will be made clear by the description below. Further, the advantages of the present invention will be evident from the following explanation in reference to the drawings.

DESCRIPTION OF EMBODIMENTS

First Embodiment

Figure 1:
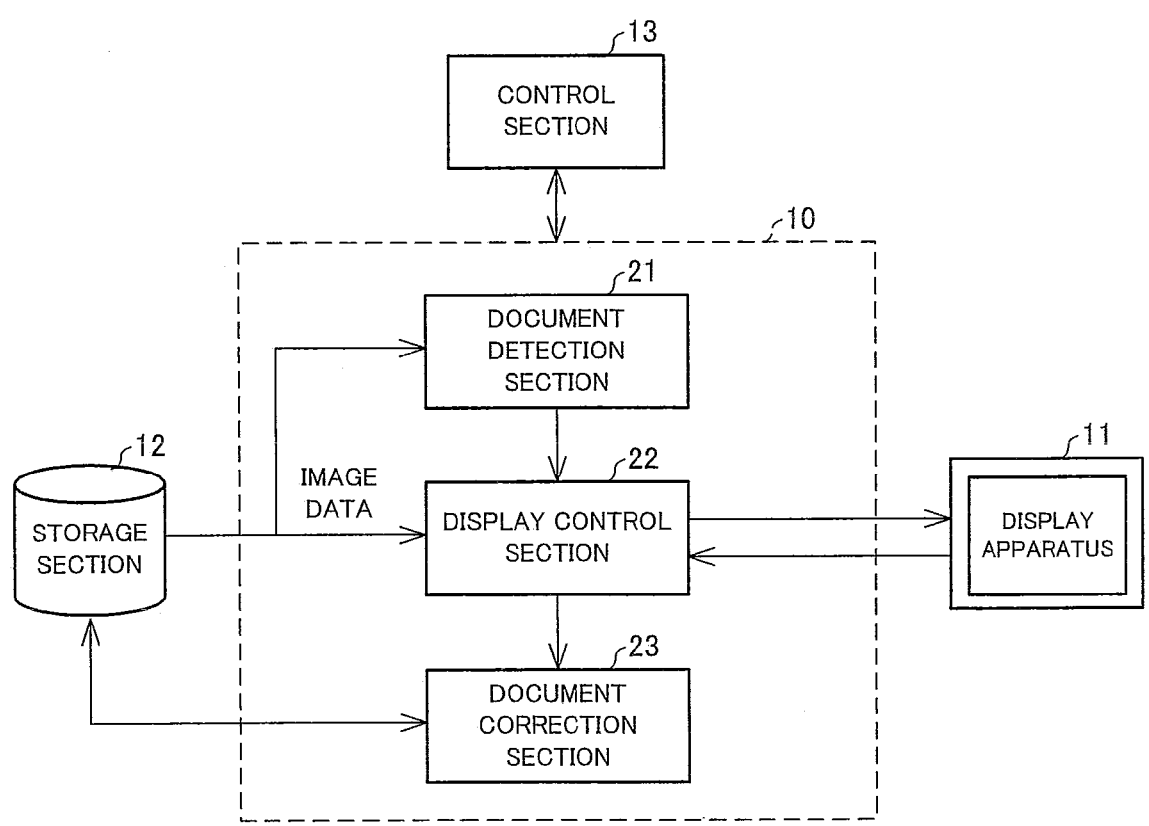
FIG. 1 is a block diagram schematically illustrating an arrangement of an image processing apparatus in accordance with one embodiment of the present invention.

The following description deals with one embodiment of an image processing apparatus of the present invention with reference to the attached drawings. FIG. 1 is a block diagram schematically illustrating an arrangement of an image processing apparatus 10 of the present embodiment.

The image processing apparatus 10 is included in an image forming apparatus (not illustrated in FIG. 1), which is a copying machine or a multifunction printer. If a document image is read from a document by an image input apparatus (scanner) included in the image forming apparatus, the image processing apparatus 10 carries out image processing with respect to the document image.

Further, as illustrated in FIG. 1, the image processing apparatus 10 is connected to: a display apparatus 11; a storage section 12; and a control section 13. The display apparatus 11 displays a display image created in the image processing apparatus 10. Furthermore, the storage section 12 stores: a document image read by the image input apparatus; a document image processed in the image processing apparatus 10; and the like. Moreover, a document image stored in the storage section 12 can be inputted into the image processing apparatus 10.

The display apparatus 11 is image display means including an operation panel of the image forming apparatus. The display apparatus 11 provides a user with information that is necessary to operate the image forming apparatus. The display apparatus 11 is a touch screen covered with a touch panel, and an image displayed on the display apparatus 11 functions as a graphical user interface. The display apparatus 11 may be general image display means such as a liquid crystal display.

The storage section 12 is data storage means included in the image forming apparatus. The storage section 12 may be a general hard disc apparatus, for example.

The control section 13 controls operation of the image processing apparatus 10, operation of the storage section 12, operation of the display apparatus 11, and the like. Further, the control section 13 controls: a data flow in the image processing apparatus 10; a data flow between the image processing apparatus 10 and the storage section 12; and a data flow between the image processing apparatus 10 and the display apparatus 11. The control section 13 is a computer constituted by a CPU, an RAM, a ROM, and the like.

Next, the following description deals with details of an internal arrangement of the image processing apparatus 10. As illustrated in FIG. 1, the image processing apparatus 10 includes a document detection section 21, a display control section 22, and a document correction section 23.

The document detection section 21 illustrated in FIG. 1 is a block which, in a case where a document image read by the image input apparatus is written into the storage section 12, (i) reads out the document image from the storage section 12, and then (ii) outputs top-to-bottom direction information indicating a top-to-bottom direction of a document shown in the document image. In the present embodiment, the top-to-bottom direction of a document means a direction from a top side of the document to a bottom side of the document.

In order to carry out the processing of the document detection section 21, a method described in said Patent Literature 2 may be used. The following description deals with a procedure of a determining process carried out in the document detection section 21.

[Patterning]

Firstly, based on an OCR (Optical Character Recognition) technique, the document detection section 21 develops a pattern for each character written on a document shown in a document image.

[Matching]

Secondly, the document detection section 21 compares character patterns A obtained from the document image with character patterns B which has been included in a database in advance. In this comparison, a character pattern A and character patterns B are caused to overlap each other so as to determine whether or not the character pattern A and one of the character patterns B are identical with each other in color (black and white). If all of the pixels of the character pattern A and all of the pixels of one of the character patterns B are identical with each other in color (black and white), a character of the character pattern A and a character of the character pattern B are determined as being "Identical". Further, if the database has no character pattern B that is identical with the character pattern A in color (black and white) in all pixels, a character pattern B having the largest number of pixels that are identical with those of the character pattern A in color (black and white) is selected. Then, a character of the character pattern A and a character of the character pattern B are determined as being "Identical". If the database has no character pattern B having not less than a predetermined number of pixels that are identical with those of the character pattern A in color (black and white), it will be decided that the determination is impossible.

[Determining]

Further, the document detection section 21 carries out rotation processing at rotation angles of 90°, 180°, and 270° with respect to each of the character patterns A obtained from the document image data, and repeats the matching process described above with respect to each of the character patterns A obtained by each rotation processing. Then, the document detection section 21 outputs, as top-to-bottom direction information (information indicating a top-to-bottom direction of a document), a rotation angle at which the highest number of characters determined as "Identical" is obtained (note that a rotation angle of a character that has not been subjected to the rotation processing is 0°) in the matching process.

Here, "the top-to-bottom direction information is 0°" means that a top-to-bottom direction from a top side α of a document to a bottom side β of the document coincide with a direction (hereinafter, referred to as an "upper-to-lower direction") from an upper part of a document image to a lower part of the document image, as indicated by a reference numeral 150 in FIG. 2(a). Further, "the top-to-bottom direction information is 90°" means that the top-to-bottom direction is inclined at 90° against the upper-to-lower direction, as indicated by a reference numeral 152 in FIG. 2(a). Moreover, "the top-to-bottom direction information is 180°" means that the top-to-bottom direction is opposite to the upper-to-lower direction, as indicated by a reference numeral 151 in FIG. 2(a).

Next, the following explains the display control section 22 illustrated in FIG. 1. The display control section 22 illustrated in FIG. 1 reads out a document image written in the storage section 12, and downsamples the document image to create a downsampled document image (hereinafter, referred to as a "display image"). Further, the display control section 22 carries out image processing with respect to the display image so that an instruction mark 201 (described later) and the display image overlap each other. After that, the display control section 22 causes the display apparatus 11 to display the display image.

[Downsampling]

The display control section 22 reads out a document image stored in the storage section 12, and then downsamples the display image. The document image is downsampled so that an entire document shown in the display image that has been subjected to the downsampling is displayed on the display apparatus 11. Further, the document image may be downsampled by an interpolation process, such as a nearest neighbor method, a bilinear method, or a bicubic method, for example.

The nearest neighbor method is a method in which either a value of an existing pixel that is closest to the interpolation pixel generated by an interpolation, or a value of an existing pixel that is in a predetermined positional relationship with the interpolation pixel is provided as a value of an interpolation pixel. The bilinear method is a method in which (i) a weighted average value of values of four existing pixels surrounding an interpolation pixel (a weight is a factor proportional to a distance from the interpolation pixel to an existing pixel) is obtained, and (ii) the obtained value is provided as a value of the interpolation pixel. The bicubic method is a method in which interpolation calculations are carried out by use of a total of 16 existing pixels (the four existing pixels surrounding the interpolation pixel, and 12 existing pixels surrounding said four existing pixels).

[Processing of Creating Instruction Mark]

Figure 4:
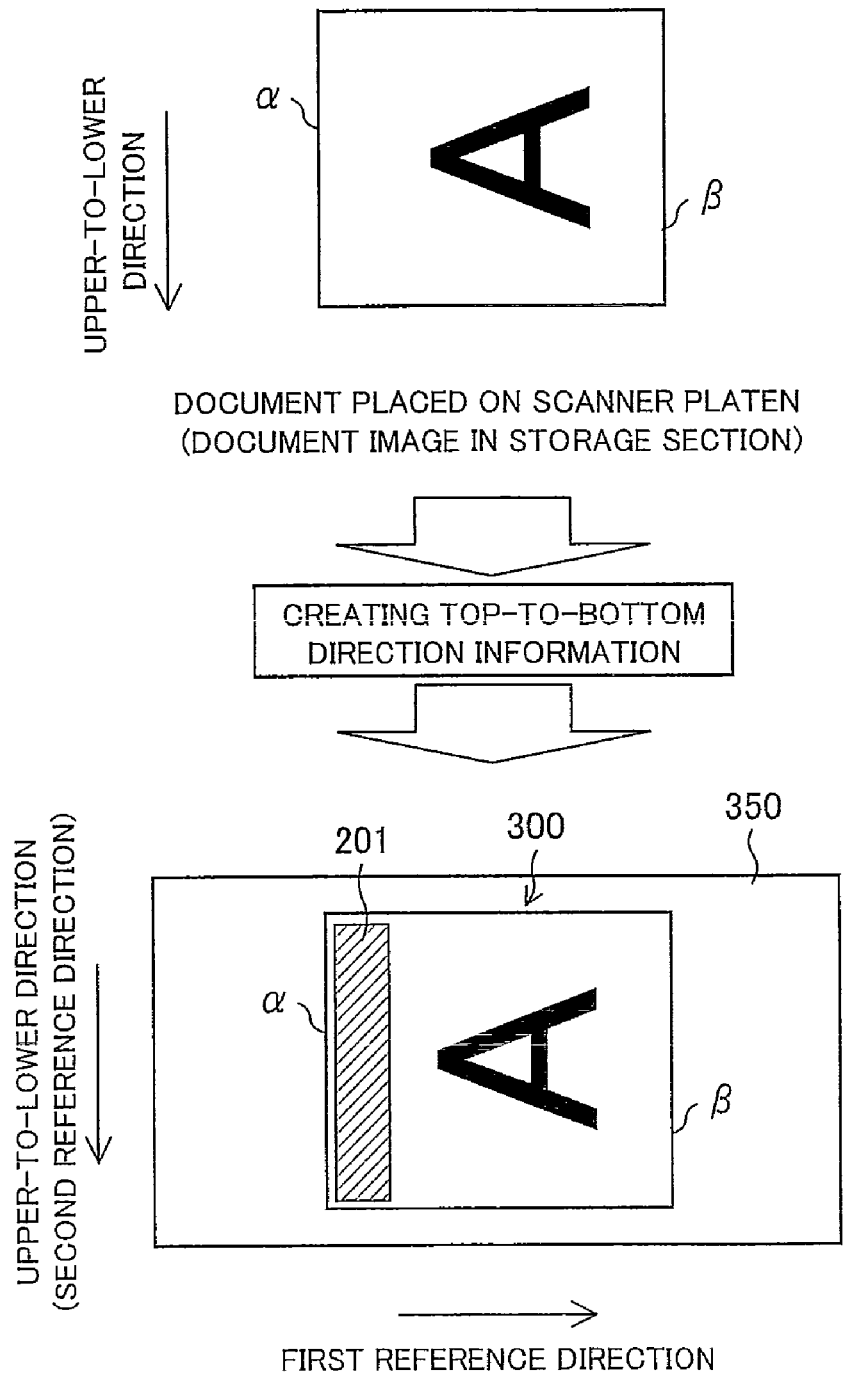
FIG. 4 is a view explaining processing carried out in the first embodiment.

As illustrated in FIG. 4, the instruction mark 201 is displayed such that the instruction mark 201 and a display image 350 overlap each other on a display screen of the display apparatus 11, more specifically, the instruction mark 201 and a region of document 300 shown in the display image 350 overlap with each other.

Further, the instruction mark 201 is arranged to be in contact with any one entire reference side among sides of the document 300, so as to have a function of indicating the reference side to a user. In the present embodiment, a top side α of a document is used as the reference side, as illustrated in FIG. 4.

Further, the instruction mark 201 also functions as a button for a user to input a command on the graphical user interface. Specifically, if a user touches the instruction mark 201 displayed on the display apparatus 11, the document correction section 23 reads out a document image from the storage section 12, and then carries out the rotation processing with respect to the document image. That is, the instruction mark 201 also functions as a button via which a user inputs a command to carry out the rotation processing.

The processing of creating the instruction mark is such that (i) a position (coordinate) where the instruction mark 201 and the display image displayed on the display apparatus 11 overlap each other is calculated, and (ii) the display image is image-processed so that the instruction mark 201 and the display image overlap each other in the calculated position. The following description deals with an example of a method of calculating a position where the instruction mark and the display image overlap each other.

Figure 3:
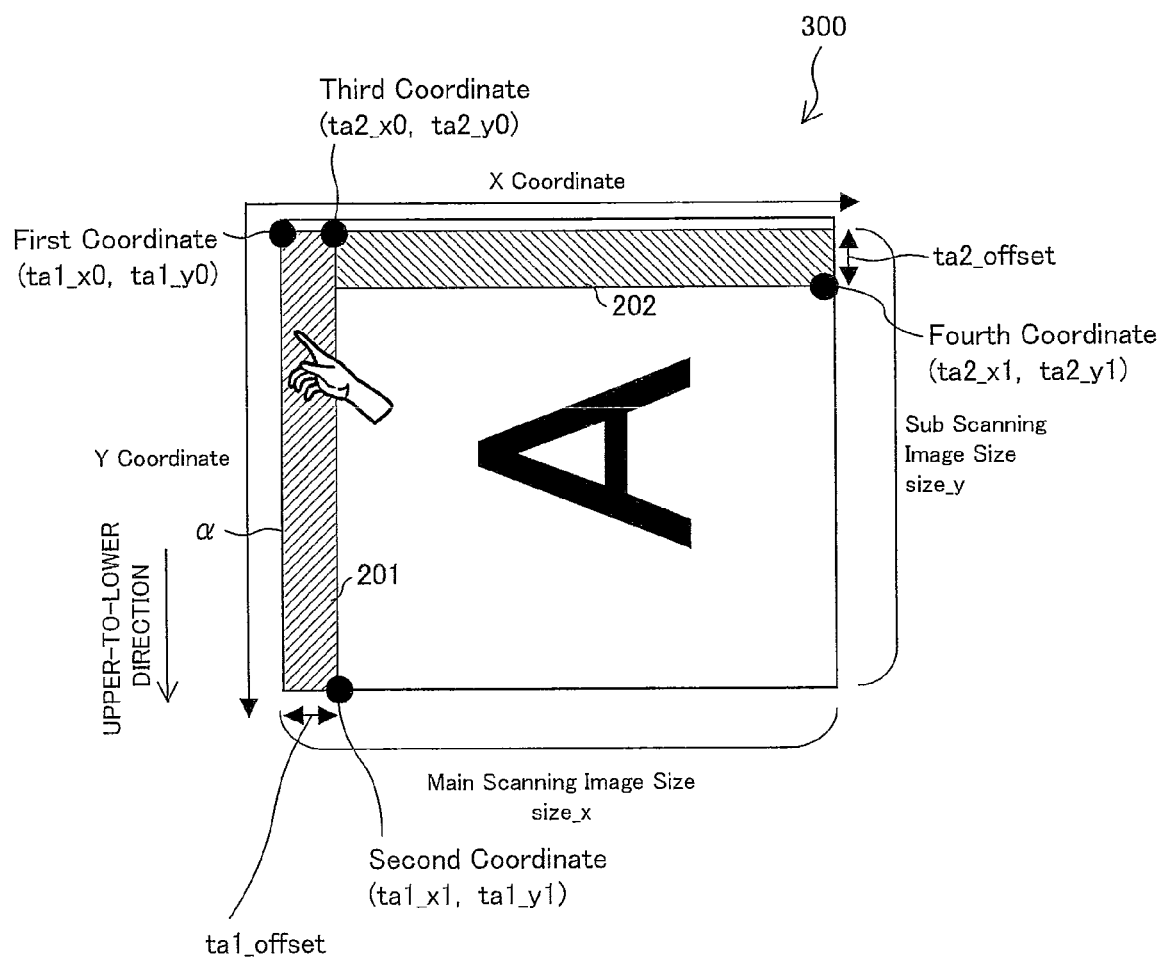
FIG. 3 is a view explaining a method of calculating a position where an instruction mark and a selection mark, and a document image overlap each other.

As illustrated in FIG. 3, in accordance with the top-to-bottom direction information created by the document detection section 21, the display control section 22 finds the top side α of the document 300 shown in the display image, and provides an end of the top side α as a first coordinate (ta1_x0, ta1_y0). Further, in a case where a coordinate value of the first coordinate (ta1_x0, ta1_y0) is determined as indicated by the following formulas 1 and 2, the display control section 22 determines a coordinate value of a second coordinate (ta1_x1, ta1_y1) based on the following formulas 3 and 4.

$$ta1\_x0 = 0 \quad \text{Formula 1}$$

$$ta1\_y0 = 0 \quad \text{Formula 2}$$

$$ta1\_x1 = ta1\_\text{offset} \quad \text{Formula 3}$$

$$ta1\_y1 = size\_y - 1 \quad \text{Formula 4}$$

The display control section 22 provides the first coordinate (ta1_x0, ta1_y0) and the second coordinate (ta1_x1, ta1_y1) as vertexes in the display image, and sets such a rectangle region that a straight line between the vertexes is a diagonal line of the rectangle region. Then, the display control section 22 determines all pixels included in the rectangle region as a region where the display image and the instruction mark 201 overlap each other.

After that, the display control section 22 carries out the image processing with respect to the display image so that the instruction mark 201 and the rectangle region overlap each other. And then the display control section 22 carries out tone correction processing (γ correction) with respect to the image-processed display image, and causes the display apparatus 11 to display the display image that has been subjected to the tone correction processing. Here, the tone correction processing is tone conversion processing carried out in accordance with display characteristics of the display apparatus 11.

That is, in the present embodiment, first, the top-to-bottom direction information is created in accordance with a document image read out from a document placed on a scanner platen, as illustrated in FIG. 4. Then, in accordance with the top-to-bottom direction information, the instruction mark 201 for allowing a user to recognize, as the reference side, the top side α of the document 300 shown in the display image 350 is created. Further, the instruction mark 201 and the display image 350 are displayed on the display apparatus 11 so that the instruction mark 201 and the display image 350 overlap each other.

Next, the following description deals with the document correction section 23 illustrated in FIG. 1. The document correction section 23 illustrated in FIG. 1 is a block which, in a case where a user touches the instruction mark 201 (see FIG. 4) in the display image 350 displayed on the display apparatus 11, (i) reads out the document image stored in the storage section 12, and (ii) carries out rotation processing with respect to the read-out document image. The following description deals with correction processing (rotation processing) carried out in the document correction section 23.

As illustrated in FIG. 4, in the document 300 shown in the display image 350, if a direction from the reference side (in the present embodiment, the top side α) indicated by the instruction mark 201 to the opposite side (a side facing the reference side) is provided as the first reference direction, the document correction section 23 carries out the rotation processing with respect to the document image so that the first reference direction coincides with the upper-to-lower direction (the second reference direction) of the document image which has been subjected to the rotation processing. In the present embodiment, (i) the top side α is provided as the reference side, (ii) a bottom side β is provided as the opposite side, and (iii) the top-to-bottom direction is provided as the first reference direction.

In other words, as to the document illustrated in FIG. 4, the document correction section 23 carries out the rotation processing so as to rotate the document image at 90° in a clockwise direction. Because of this, the document image that has been subjected to the rotation processing is the same as an image indicated by a reference numeral 150 in FIG. 2(a).

Then, the document correction section 23 overwrites the document image stored in the storage section 12 with the document image that has been subjected to the rotation processing. Further, an image forming apparatus including the image processing apparatus 10 carries out print processing based on the document image that has been subjected to the rotation processing and overwritten the document image stored in the storage section 12.

Figure 5:
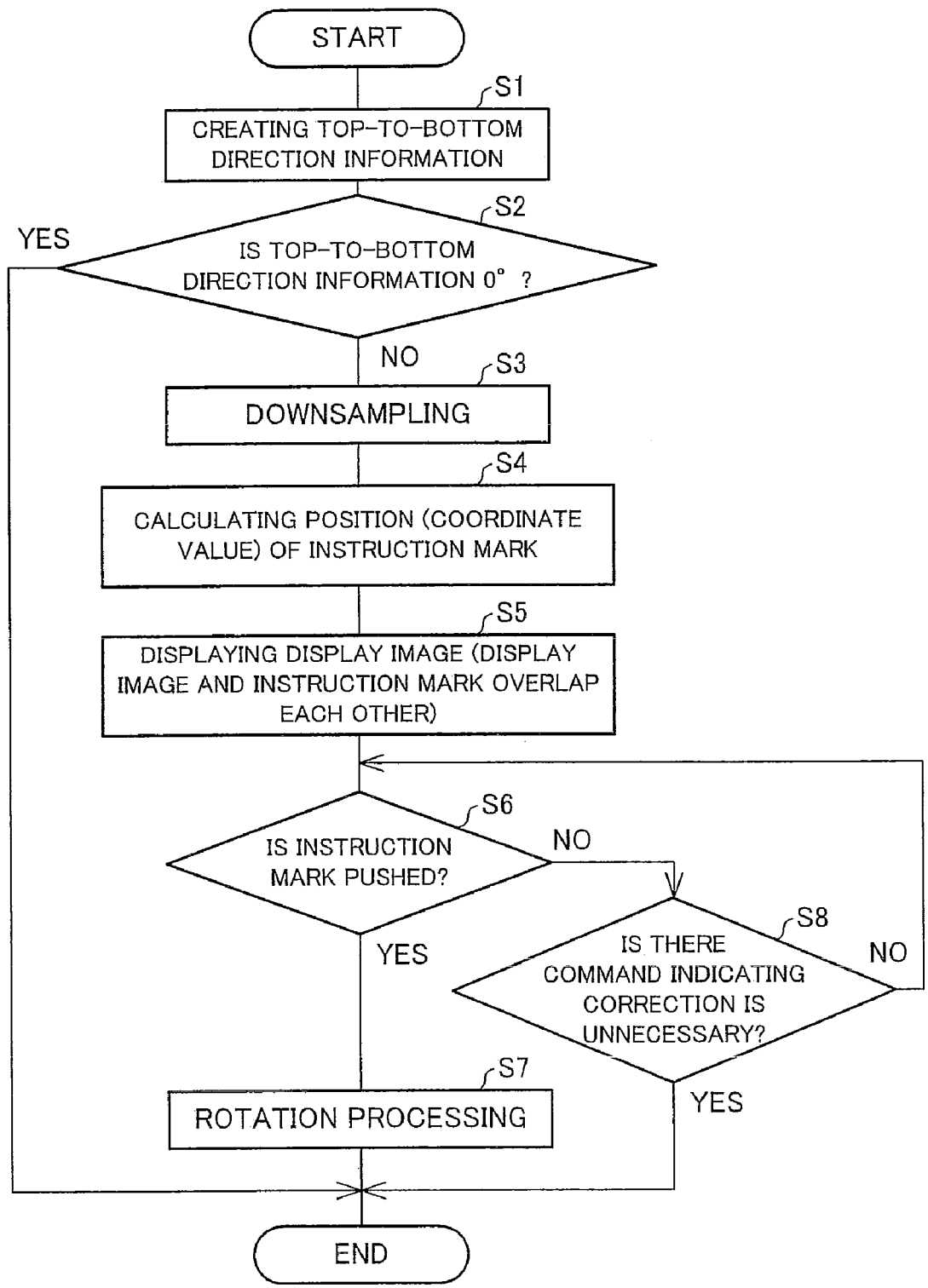
FIG. 5 is a flow chart illustrating a flow of the processing carried out in the first embodiment.

Next, the following description deals with a procedure of processing of the image processing apparatus 10 with reference to FIG. 5. FIG. 5 is a flow chart illustrating a flow of the processing carried out in the first embodiment.

First, if a document image read out by the image input apparatus (scanner) is written into the storage section 12, the document detection section 21 creates top-to-bottom direction information indicating a top-to-bottom direction of a document shown in the document image, as illustrated in FIG. 5 (S1).

Next, the display control section 22 determines whether or not the top-to-bottom direction information created in S1 is 0° (S2). If the top-to-bottom direction information is 0°, the processing is finished ("Yes" in S2). If the top-to-bottom direction information is not 0° ("No" in S2), the display control section 22 reads out the document image from the storage section 12, and then downsamples the read-out document image (S3).

After S3, the display control section 22 calculates a position (coordinate) where an instruction mark and the display image that has been downsampled overlap each other (S4). Further, based on the position obtained in S4, the display control section 22 causes the display apparatus 11 to display the display image 350 so that the instruction mark 201 and the display image 350 overlap each other, as illustrated in FIG. 4 (S5).

After S5, if a user touches the instruction mark 201 ("Yes" in S6), the document correction section 23 reads out the document image stored in the storage section 12, and then carries out the rotation processing with respect to the read-out document image (S6). Here, in the present embodiment, a rotation angle of the rotation processing is set to be identical with an angle indicated by the top-to-bottom direction information. Because of this, the rotation processing is carried out so that the first reference direction from the reference side (the top side α in FIG. 4) indicated by the instruction mark to the opposite side (the side facing the reference side) coincides with the upper-to-lower direction of the document image which has been subjected to the rotation processing. Further, after S5, if the document correction section 23 receives, via an operation panel (not illustrated) or the like, a command indicating that the correction is unnecessary ("No" in S6, and "Yes" in S8), the processing is finished without the rotation processing being carried out.

As described above, the image processing apparatus 10 of the present embodiment includes: the document correction section 23 for carrying out the rotation processing so that the first reference direction from the reference side of the document shown in the document image to the opposite side of the reference side coincides with the upper-to-lower direction of the document image which has been subjected to the rotation processing; and the display control section 22 for causing the display apparatus 11 to display the display image 350 in which (i) the document 300, and (ii) the instruction mark 201 indicating the reference side of the document 300 to a user are shown. Therefore, with the image processing apparatus 10 which carries out the rotation processing so that the first reference direction from the reference side of the document to the opposite side (the side facing the reference side) coincides with the upper-to-lower direction of the document image which has been subjected to the rotation processing, it becomes possible to allow the user to recognize the reference side before the rotation processing is carried out. This allows the user to easily predict how the document shown in the document image will be oriented after the document image is subjected to the rotation processing.

Further, the image processing apparatus 10 of the present embodiment includes the document detection section 21 for determining the top-to-bottom direction from the top side α of the document shown in the document image to the bottom side β of the document, and in a case where the top-to-bottom direction does not coincide with the upper-to-lower direction of the document image (in a case where the top-to-bottom direction information is not 0°), the display control section 22 causes the display apparatus 11 to display the display image. Therefore, in a case where the top-to-bottom direction of the document shown in the document image does not coincide with the upper-to-lower direction of the document image, the display image is automatically displayed. This allows a user to recognize a necessity of carrying out the rotation processing.

Further, in the image processing apparatus 10 of the present embodiment, the top side α of the document is provided as the reference side, and the top-to-bottom direction from the top side α of the document to the bottom side β of the document is provided as the first reference direction from the reference side to the opposite side. Accordingly, if the rotation processing is carried out with respect to the document image, the top-to-bottom direction of the document shown in the document image coincides with the upper-to-lower direction of the document image which has been subjected to the rotation processing.

Furthermore, it is possible to (i) detected a document size and a document orientation (A4 placed horizontally, A4 placed vertically, or a document in which a variety of document sizes exist (if an ADF (Auto Document Feeder) is used), for example), and (ii) if it is determined that the document size or the document orientation is correct, finish the processing without the document image being displayed on the display apparatus 11 (even if the top-to-bottom direction information is not 0° in S2) ("Yes" in S2). The reason is that, for example, there may be a case where a vertically-written A4 document includes a horizontally-written A4 chart or diagram, and in such a case, the rotation processing is unnecessary.

The detection of the document size is carried out as described below. In a case where a document is placed and read on a scanner platen, the following method may be adopted, that is, a method in which a photoelectric conversion element (such as a photo transistor) arranged in the image input apparatus detects a document size in a main scanning direction and a sub scanning direction, for example. Alternatively, a user may input a selection via an operation panel so as to determine a document size. Further, in a case where a document is read from the ADF, a document size may be detected from an image region (the number of pixels) read by an image sensor, such as a apparatus, in the main scanning direction and the sub scanning direction.

Second Embodiment

Next, the following description deals with a second embodiment, which is different from the first embodiment. For easier explanation, the second embodiment only explains features different from the first embodiment, and common features are omitted as much as possible.

In the first embodiment, a display image displayed on the display apparatus 11 indicates a document of a document image that has not been subjected to the rotation processing carried out by the document correction section 23. In other words, in the first embodiment, in a case where (i) a top-to-bottom direction of a document shown in a document image that has not been subjected to the rotation processing is inclined at 90° against an upper-to-lower direction of the document image, and (ii) the rotation processing is carried out with respect to the document image so that the top-to-bottom direction of the document shown in the document image coincides with the upper-to-lower direction of the document image which has been subjected to the rotation processing, the display apparatus 11 displays the display image 350 in which the document 300 whose top-to-bottom direction is inclined at 90° against the upper-to-lower direction of the document image is shown, as illustrated in FIG. 4.

Figure 6:
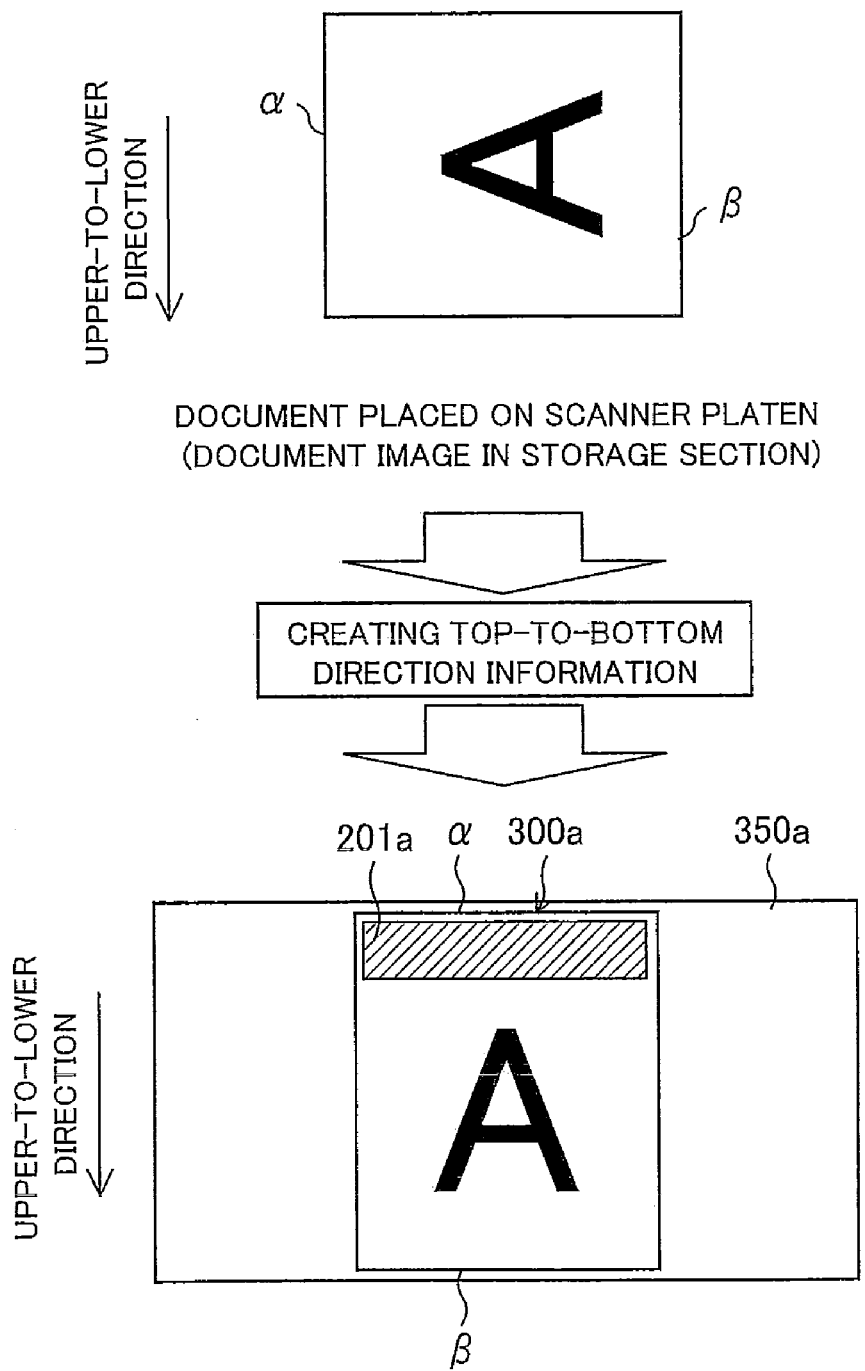
FIG. 6 is a view explaining processing carried out in a second embodiment.

A procedure of the second embodiment is the same as that of the first embodiment until the display image (the image that has been downsampled) is displayed on the display apparatus 11 before the document correction section 23 carries out the rotation processing. However, the second embodiment differs from the first embodiment in that provisional rotation processing is carried out with respect to the display image displayed on the display apparatus 11 at a rotation angle identical with that of the rotation processing carried out by the document correction section 23. That is, in the second embodiment, in a case where, for example, (i) a top-to-bottom direction of a document shown in a document image that has not been subjected to the rotation processing is inclined at 90° against an upper-to-lower direction of the document image, and (ii) the rotation processing is carried out with respect to the document image so that the top-to-bottom direction of the document shown in the document image coincides with the upper-to-lower direction of the document image which has been subjected to the rotation processing, the display apparatus 11 displays a display image 350*a* in which the upper-to-lower direction of the document image coincides with a top-to-bottom direction of a document 300*a*, as illustrated in FIG. 6.

Figure 7:
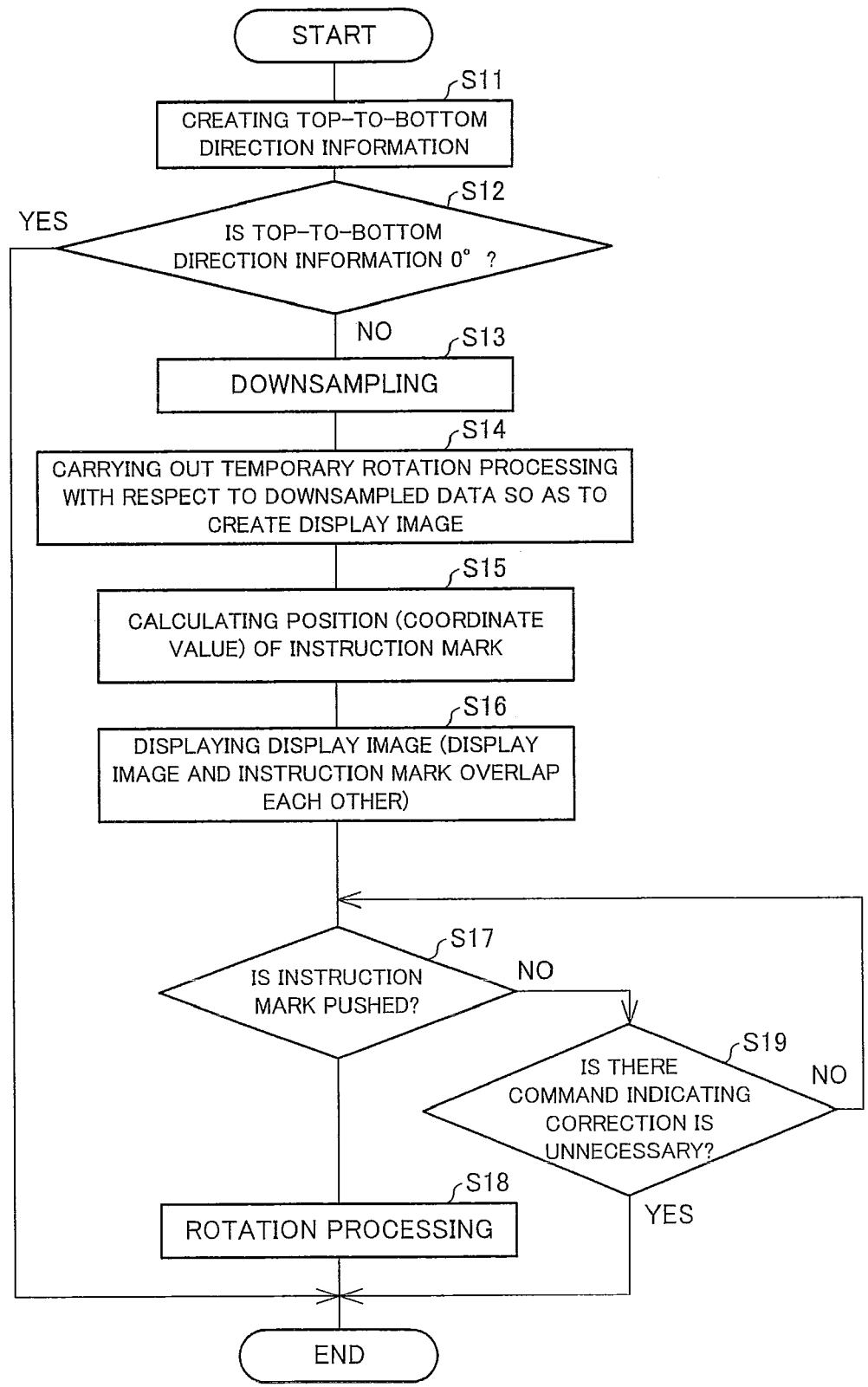
FIG. 7 is a flow chart illustrating a flow of the processing carried out in the second embodiment.

The following description deals with processing carried out in the second embodiment with reference to FIG. 7. FIG. 7 is a flow chart illustrating a flow of the processing carried out in the second embodiment.

First, if a document image read by the image input apparatus (scanner) is written into the storage section 12, the document detection section 21 creates top-to-bottom direction information indicating a top-to-bottom direction of a document shown in the document image, as illustrated in FIG. 7 (S11).

Next, the display control section 22 determines whether or not the created top-to-bottom direction information is 0° (S12). If the top-to-bottom direction information is 0°, the processing is finished ("Yes" in S12). If the top-to-bottom direction information is not 0° ("No" in S12), the display control section 22 reads out the document image from the storage section 12, and then downsamples the read-out document image (S13).

After S13, the display control section 22 carries out provisional rotation processing with respect to the document image that has been downsampled, so as to create a display image 350*a* illustrated in FIG. 6 (S14). Here, the provisional rotation processing means rotation processing carried out with respect to the document image that has been downsampled in S13, at the rotation angle identical with an angle indicated by the top-to-bottom direction information. That is, the top-to-bottom direction of the document 300*a* shown in the display image 350*a* created in S14 is identical with a top-to-bottom direction of a document shown in a document image that has been subjected to the rotation processing carried out by the document correction section 23. In other words, the display image 350*a* created in S14 is a small-scaled image of the document image that has been subjected to the rotation processing carried out by the document correction section 23.

After S14, the display control section 22 calculates a position (coordinate) where an instruction mark 201*a* and the display image overlap each other (S15). The position of the instruction mark 201*a* is determined based on the top-to-bottom direction information. Specifically, based on the top-to-bottom direction information, a top side α of the document shown in the document image (downsampled image) that has not been subjected to the provisional rotation processing of S14 is found. And then, a coordinate value of a rectangle region, which is in contact with the entire top side α, is calculated (in the same manner as the example illustrated in FIG. 3). After that, the obtained coordinate value is rotated at 90° (the angle indicated by the top-to-bottom direction information). The obtained value is provided as a position of the instruction mark.

Further, in accordance with the position obtained in S15, the display control section 22 causes the display apparatus 11 to display the display image 350a and the instruction mark 201a so that the display image 350a and the instruction mark 201a overlap each other, as illustrated in FIG. 6 (S16). After S16, if a user touches the instruction mark 201a ("Yes" in S17), the document correction section 23 reads out the document image stored in the storage section 12, and then carries out the rotation processing with respect to the read-out document image (S18). More specifically, the rotation processing is also carried out with respect to the document image stored in the storage section 12 so that the top-to-bottom direction of the document coincides with the upper-to-lower direction of the document image which has been subjected to the rotation processing (as the display image 350a illustrated in FIG. 6).

Further, after S16, if the document correction section 23 receives, via the operation panel (not illustrated) or the like, a command indicating that the correction is unnecessary ("No" in S17, "Yes" in S19), the document correction section 23 finishes the processing without carrying out the rotation processing.

As described above, according to the present embodiment, the display control section 22 (i) carries out the provisional rotation processing with respect to the downsampled document image at the rotation angle identical with that of the rotation processing carried out by the document correction section 23, and (ii) causes the display apparatus 111 to display the display image in which the document 300a that has been subjected to the provisional rotation processing and the instruction mark 201a indicating a reference side of the document 300a to a user are shown. This allows a user to check the display image in which a document image that has been subjected to the provisional rotation processing at the rotation angle identical with that of the rotation processing carried out by the document correction section 23 is shown. Therefore, the user can predict more realistically how the document will be oriented after the rotation processing is carried out by the document correction section 23.

Third Embodiment

Next, the following description deals with a third embodiment, which is different from the first and second embodiments. For easier explanation, the third embodiment explains only features different from the first second embodiments, and common features are omitted as much as possible.

In the first and second embodiments, the instruction mark 201 (201a) is arranged to be in contact with an entire top side α of the document 300, so as to indicate the top side α to a user. However, in the first and second embodiments, the instruction mark 201 merely indicates the top side α as a result. An essential function of the instruction mark 201 is not to indicate the top side α to a user.

The essential function of the instruction mark 201 is to allow a user to recognize the reference side before the rotation processing is carried out, in a case where the rotation processing is carried out with respect to a document image so that the first reference direction from the reference side of a document shown in the document image to the opposite side of the reference side coincides with the upper-to-lower direction of the document image which has been subjected to the rotation processing. Therefore, in a case where such rotation processing is carried out that the upper-to-lower direction of the document image which has been subjected to the rotation processing does not coincide with the top-to-bottom direction of the document, the instruction mark 201 does not indicate the top side α of the document but another side of the document. The following description deals with an embodiment in which the instruction mark 201 indicates a side other than the top side α.

Figure 8:
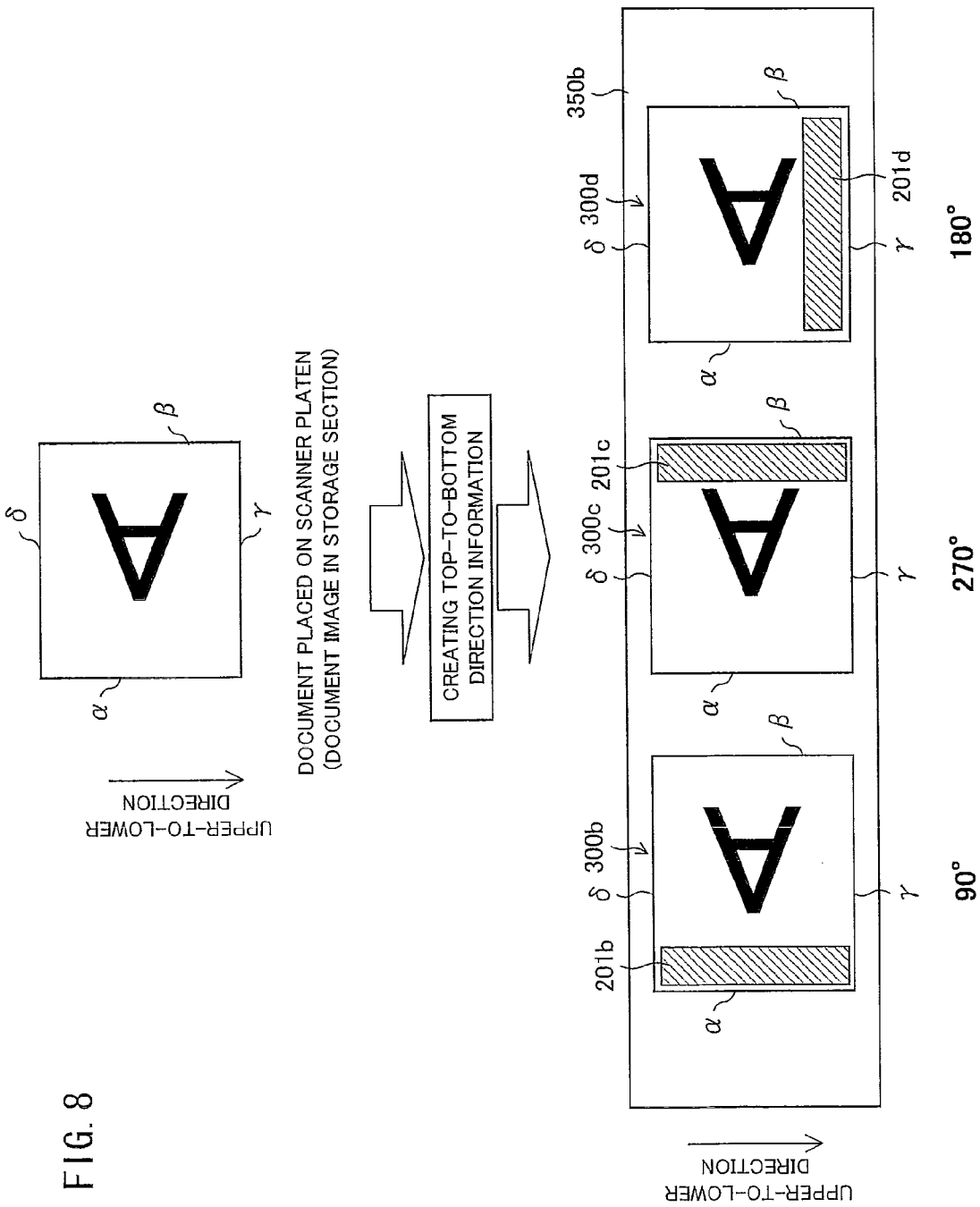
FIG. 8 is a view explaining processing carried out in a third embodiment.

In the third embodiment, the display apparatus 11 displays a display image 350b in which the document 300 and the instruction mark 201 are shown for each of settable rotation angles (90°, 180°, 270°) in the image processing apparatus 10, as illustrated in FIG. 8. More specifically, since there are three settable rotation angles in the image processing apparatus 10 of the present embodiment, three documents that have not been subjected to the rotation processing are shown in the display image 350b such that each of the documents and an instruction mark overlap each other. In the display image 350b illustrated in FIG. 8, documents 300b, 300c, and 300d, and instruction marks 201b, 201c, and 201d are shown.

Further, in the example illustrated in FIG. 8, the top-to-bottom direction of the document shown in the document image stored in the storage section 12 is inclined at 90° against the upper-to-lower direction of the document image. At this point, on the display apparatus 11, the instruction mark 201b corresponding to the rotation angle of 90° and the document 300b overlap each other so that the instruction mark 201b indicates a top side α of the document 300b, the instruction mark 201c corresponding to the rotation angle of 270° and the document 300c overlap each other so that the instruction mark 201c indicates a bottom side β of the document 300c, and the instruction mark 201d corresponding to the rotation angle of 180° and the document 300d overlap each other so that the instruction mark 201d indicates a left side γ of the document 300d.

If a user touches the instruction mark 201b, the document correction section 23 reads out the document image stored in the storage section 12, and carries out the rotation processing with respect to the document image so that the top-to-bottom direction (the direction from the top side α to the bottom side β) of the document shown in the document image coincides with the upper-to-lower direction of the document image which has been subjected to the rotation processing. As a result, the rotation processing (clockwise rotation) is carried out at the rotation angle of 90°.

Further, in FIG. 8, if a user touches the instruction mark 201c, the document correction section 23 reads out the document image stored in the storage section 12, and carries out the rotation processing with respect to the document image data so that a direction from the bottom side β of the document shown in the document image to the top side α of the document coincides with the upper-to-lower direction of the document image which has been subjected to the rotation processing. As a result, the rotation processing (clockwise rotation) is carried out at the rotation angle of 270°.

Furthermore, in FIG. 8, if a user touches the instruction mark 201d, the document correction section 23 reads out the document image stored in the storage section 12, and carries out the rotation process with respect to the document image so that a direction from the left side γ of the document shown in the document image to a right side δ of the document coincides with the upper-to-lower direction of the document image which has been subjected to the rotation processing. As a result, the rotation processing (clockwise rotation) is carried out at the rotation angle of 180°.

That is, in the present embodiment, too, the document correction section 23 carries out the rotation processing so that the first reference direction from the document's reference side indicated by the instruction mark touched by a user to the opposite side of the reference side coincides with the upper-to-lower direction of the document image which has been subjected to the rotation processing. Therefore, each of the instruction marks 201b, 201c, and 201d, of the display image 350b illustrated in FIG. 8, indicates a top side of the document image that has been subjected to the rotation processing. In other words, in a case where the rotation processing is carried out with respect to the document image so that the first reference direction from the reference side of the document to the opposite side of the reference side coincides with the upper-to-lower direction of the document image which has been subjected to the rotation processing, each of the instruction marks 201b, 201c, and 201d indicates the reference side to a user before the rotation processing is carried out.

Figure 9:
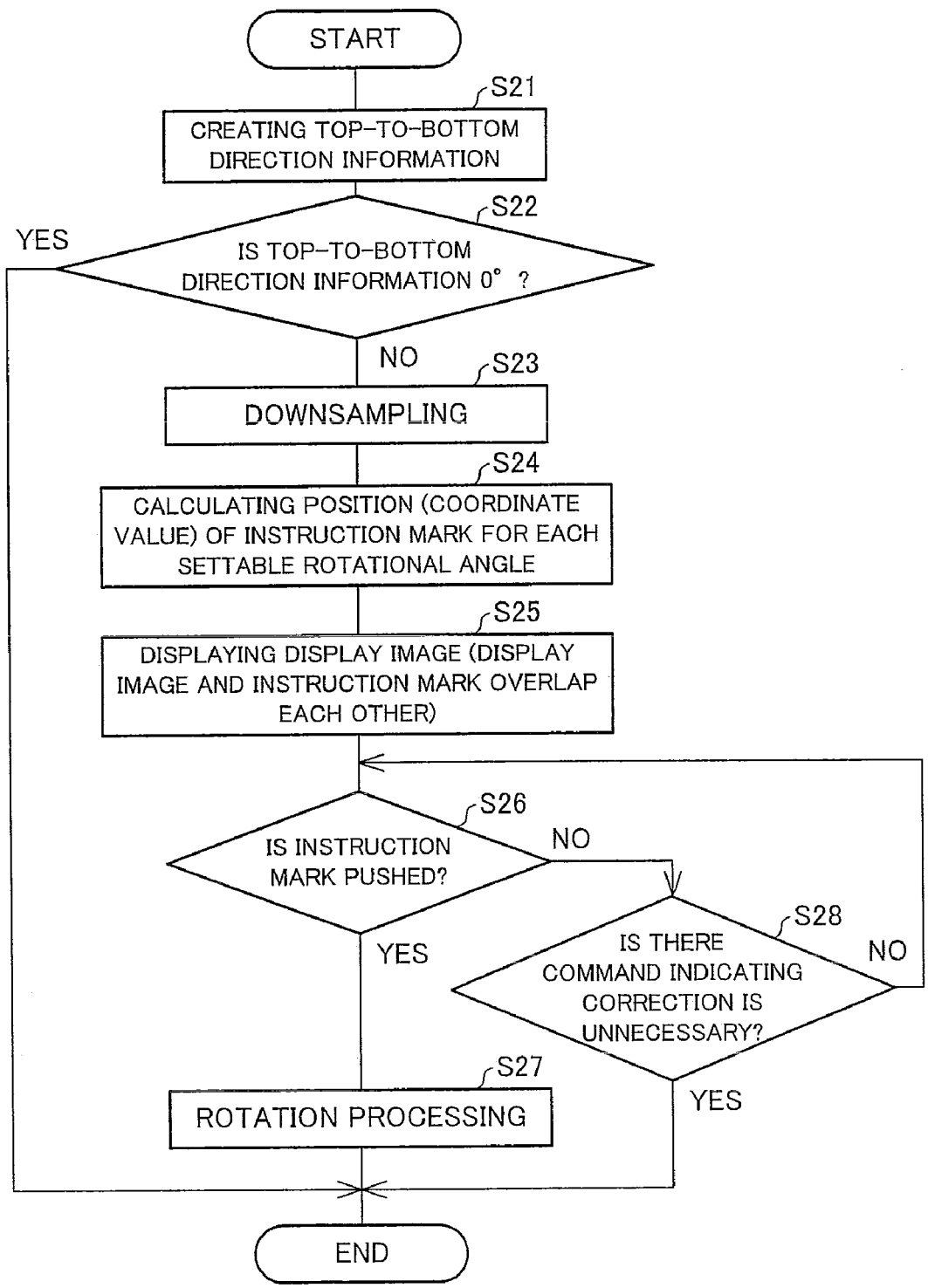
FIG. 9 is a flow chart illustrating a flow of the processing carried out in the third embodiment.

Next, the following description deals with a procedure of the processing of the present embodiment with reference to FIG. 9. FIG. 9 is a flow chart illustrating a flow of the processing carried out in the third embodiment.

First, if a document image read by the image input apparatus (scanner) is written into the storage section 12, the document detection section 21 creates top-to-bottom direction information indicating a top-to-bottom direction of a document shown in the document image, as illustrated in FIG. 9 (S21).

Next, the display control section 22 determines whether or not the top-to-bottom direction information created in S21 is 0° (S22). If the top-to-bottom direction information is 0°, the processing is finished ("Yes" in S22). If the top-to-bottom direction is not 0° ("No" in S22), the display control section 22 reads out the document image from the storage section 12, and downsamples the read-out document image (S23).

After S23, the display control section 22 calculates, for each of the settable rotation angles, a position (coordinate) where an instruction mark and the document shown in the display image overlap each other (S24). Here, each of coordinate values of the instruction marks is determined based on the top-to-bottom direction information. For example, in a case where the top-to-bottom direction information is 90°, among the sides of the document, the right side δ is located on an upper part of the display image, as illustrated in FIG. 8. Therefore, coordinate values of instruction marks corresponding to sides other than the right side δ are calculated. The coordinate values can be calculated in the same manner as in the first embodiment.

Further, the display control section 22 causes the display apparatus 11 to display the display image 350b in which the documents 300b through 300d and the instruction marks 201b through 201d are shown for respective rotation angles so that the documents and the instruction marks overlap each other, respectively (S25).

After S25, if a user touches any one of the instruction marks 201b through 201d ("Yes" in S26), the document correction section 23 reads out the document image stored in the storage section 12, and carries out the rotation processing with respect to the read-out document image (S27). Here, the rotation processing is carried out so that the first reference direction from the document's reference side indicated by the instruction mark touched by the user, to the opposite side of the reference side coincides with the upper-to-lower direction of the document image which has been subjected to the rotation processing. Further, after S25, if the document correction section 23 receives a command indicating that the correction is unnecessary ("No" in S26, "Yes" in S28), the document correction section 23 finishes the processing without carrying out the rotation processing.

Fourth Embodiment

Next, the following description deals with a fourth embodiment, which is different from the first, second, and third embodiments. The fourth embodiment corresponds to a combination of the second embodiment and the third embodiment. That is, in the fourth embodiment, the display apparatus 11 displays a document and an instruction mark for each of settable rotation angles, and a display image displayed on the display apparatus 11 is the one to that has been subjected to provisional rotation processing.

For example, a top-to-bottom direction of a document shown in a document image stored in the storage section 12 is inclined at 90° against an upper-to-lower direction of the document image. In this case, in a display image 350e displayed on the display apparatus 11, documents 300e, 300f, and 300g are shown for the respective settable rotation angles (90°, 180°, 270°). The documents 300e, 300f, and 300g have been subjected to the provisional rotation processing at the respective settable rotation angles.

Further, instruction marks 201e, 201f, and 201g are shown, respectively, in the documents 300e, 300f, and 300g, each of which is shown in the display image 350e. The instruction mark 201e corresponding to the rotation angle of 90° and the document 300e overlap each other so that the instruction mark 201e indicates a top side α of the document 300e, the instruction mark 201f corresponding to the rotation angle of 270° and the document 300f overlap each other so that the instruction mark 201f indicates a bottom side β of the document 300f, and the instruction mark 201g corresponding to the rotation angle of 180° and the document 300g overlap each other so that the instruction mark 201g indicates a left side γ of the document 300g.

Figure 10:
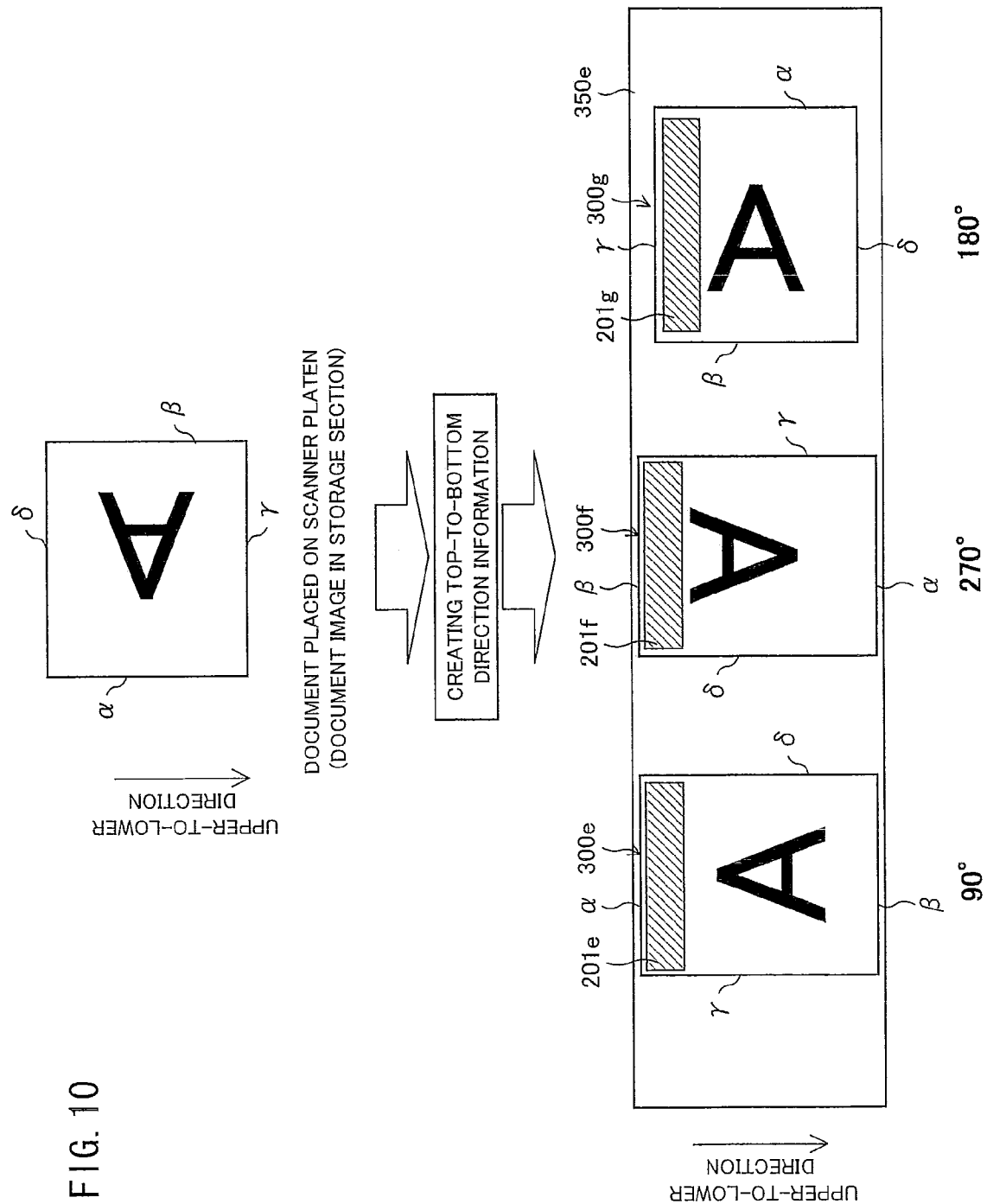
FIG. 10 is a view explaining processing carried out in a fourth embodiment.

Here, each of the documents 300e, 300f, and 300g, illustrated in FIG. 10, is a document image that has been subjected to the provisional rotation processing. Accordingly, in a case where the rotation processing is carried out with respect to the document image data so that the first reference direction from the reference side of the document to the opposite side of the reference side coincides with an upper-to-lower direction of the document image, each of the instruction marks 201e, 201f, and 201g in FIG. 10 is shown in such a position that each of the instruction marks indicates the reference side.

That is, if a user touches the instruction mark 201e, the rotation processing (at the rotation angle of 90° in a clockwise direction) is carried out with respect to the document image stored in the storage section 12 so that the top-to-bottom direction (the direction from the top side α to the bottom side β) of the document coincides with the upper-to-lower direction of the document image which has been subjected to the rotation processing. Further, if a user touches the instruction mark 201f, the rotation processing (at the rotation angle of 270° in the clockwise direction) is carried out with respect to the document image stored in the storage section 12 so that a direction from the bottom side β of the document to the upper-to-lower direction of the document image which has been subjected to the rotation processing. Furthermore, if a user touches the instruction mark 201g, the rotation processing (at the rotation angle of 180° in the clockwise direction) is carried out with respect to the document image stored in the storage section 12 so that a direction from the left side γ of the document to a right side δ of the document coincides with the upper-to-lower side of the document image which has been subjected to the rotation processing.

Figure 11:
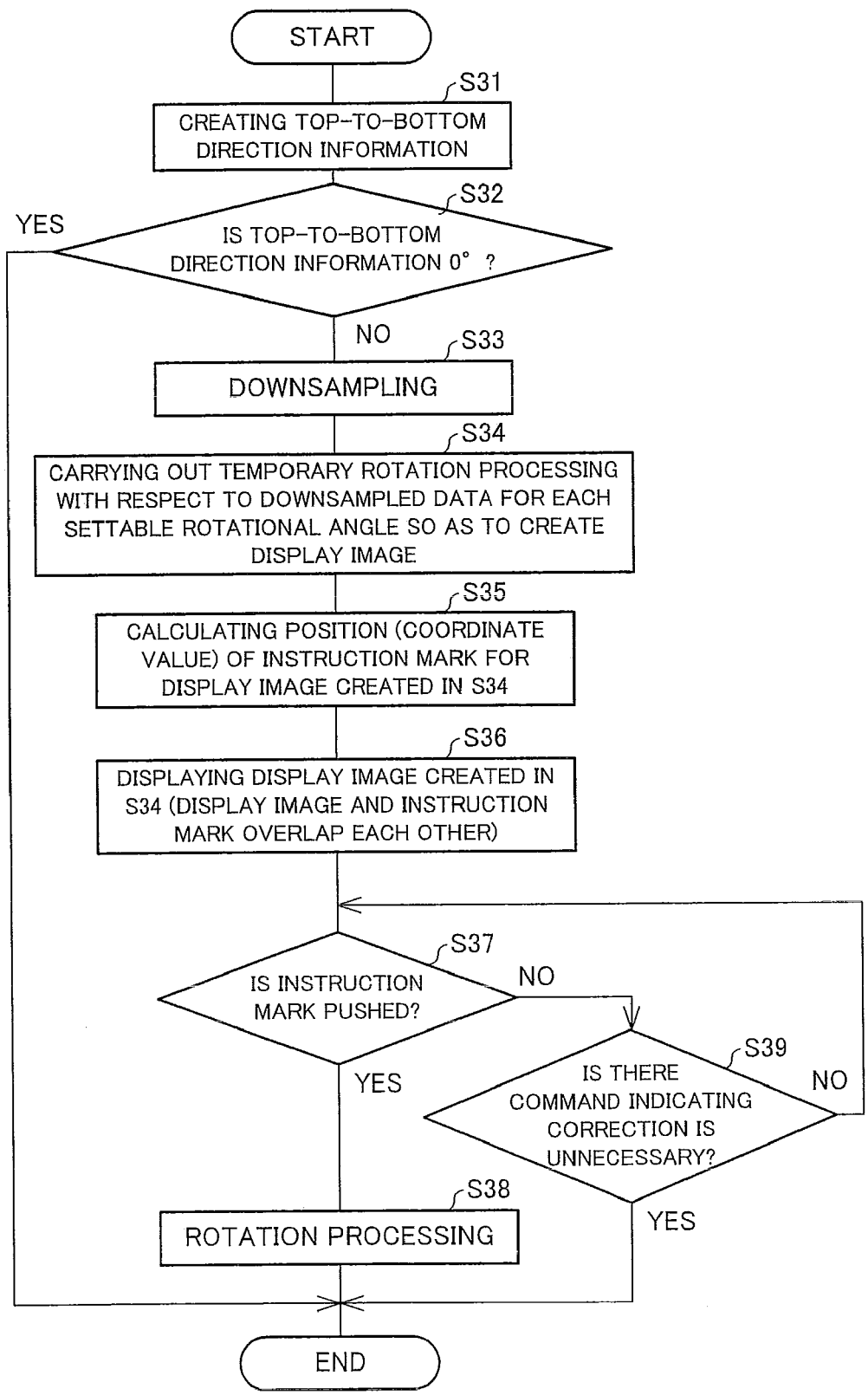
FIG. 11 is a flow chart illustrating a flow of the processing carried out in the fourth embodiment.

Next, the following description deals with a procedure of the processing carried out in the present embodiment with reference to FIG. 11. FIG. 11 is a flow chart illustrating a flow of the processing carried out in the present embodiment.

First, in a case where a document image read by the image input apparatus (scanner) is written into the storage section 12, the document detection section 21 creates top-to-bottom direction information indicating a top-to-bottom direction of a document shown in the document image, as illustrated in FIG. 11 (S31).

Next, the display control section 22 determines whether or not the top-to-bottom direction information created in S31 is 0° (S32). If the top-to-bottom direction is 0°, the display control section 22 finished the processing ("Yes" in S32). If the top-to-bottom direction information is not 0° ("No" in S32), the display control section 22 reads out the document image from the storage section 12, and then downsamples the read-out document image (S33).

After S33, the display control section 22 carries out the provisional rotation processing, for each of the settable rotation angles, with respect to the document image that has been downsampled, so as to create data of the display image 350e illustrated in FIG. 10 (S34). That is, since there are three settable rotation angles in the image processing apparatus 10 of the present embodiment, the display control section 22 creates the display image 350e in which three documents that have been subjected to the provisional rotation processing are shown. In the display image 350e illustrated in FIG. 10, (i) the document 300e that has been subjected to the provisional rotation processing at the rotation angle of 90°, (ii) the document 300f that has been subjected to the provisional rotation processing at the rotation angle of 270°, and (iii) the document 300g that has been subjected to the provisional rotation processing at the rotation angle of 180° are shown.

Next, the display control section 22 calculates, for each of the documents 300e through 300g, a position (coordinate) where an instruction mark and a document overlap each other (S35). Here, a coordinate value of each of the instruction marks is determined based on the top-to-bottom direction information. For example, the top-to-bottom direction information is 90° in the example illustrated in FIG. 10. In this case, among sides of the document shown in the document image that has not been subjected to the provisional rotation processing, the right side δ is located on an upper part of the document image. Therefore, the coordinate values of the instruction marks corresponding to the sides other than the right side δ are calculated in the document image that has been downsampled but not subjected to the provisional rotation processing. Further, if (i) the coordinate value of the instruction mark corresponding to the top side α is rotated at 90°, (ii) the coordinate value of the instruction mark corresponding to the bottom side β is rotated at 270°, and (iii) the coordinate value of the instruction mark corresponding to the left side γ is rotated at 180°, it is possible to obtain the coordinate values of the instruction marks shown in the display image 350e that has been subjected to the provisional rotation processing.

Next, the display control section 22 causes the display apparatus 11 to display the display image 350e in which the documents 300e through 300g and the instruction marks 201e through 201g are shown for respective settable rotation angles so that the documents and the instruction marks overlap each other, respectively, as illustrated in FIG. 10 (S36).

After S36, if a user touches any one of the instruction marks 201e through 201g ("Yes" in S37), the document correction section 23 reads out the document image stored in the storage section 12, and carries out the rotation processing with respect to the read-out document image (S38). Here, the rotation processing is carried out with respect to the read-out document image so that the first reference direction from the document's reference side indicated by the instruction mark touched by the user, to the opposite side of the reference side coincides with the upper-to-lower direction of the document image which has been subjected to the rotation processing.

In the present embodiment, the display image 350e displayed on the display apparatus 11 is the one that has been subjected to the provisional rotation processing. Therefore, the document image that has been subjected to the rotation processing is the same as the document image 350e illustrated in FIG. 10. That is, if a user touches the instruction mark 201e indicating the top side a of the document, the rotation processing is carried out so that the direction from the top side α of the document to the bottom side β of the document coincides with the upper-to-lower direction of the document image which has been subjected to the rotation processing. Further, if a user touches the instruction mark 201f indicating the bottom side β of the document, the rotation processing is carried out so that the direction from the bottom side β to the top side α coincides with the upper-to-lower direction of the document image which has been subjected to the rotation processing. Furthermore, if a user touches the instruction mark 201g indicating the left side γ of the document, the rotation processing is carried out so that the direction from the left side γ to the right side δ coincides with the upper-to-lower direction of the document image which has been subjected to the rotation processing.

Moreover, after S36, if the document correction section 23 receives a command indicating that the correction is unnecessary ("No" in S37, "Yes" in S39), the document correction section 23 finishes the processing without carrying out the rotation processing.

Fifth Embodiment

Next, the following description deals with a fifth embodiment, which is different from the first, second, third, and fourth embodiments. For easier explanation, the fifth embodiment deals with features different from the first, second, third, and fourth embodiments, and common features are omitted as much as possible.

In the first, second, third, and fourth embodiment, if a document image is read from a document, first, top-to-bottom direction information is created. Then, if the top-to-bottom direction information is not 0°, a user is instructed to carry out rotation processing. If the top-to-bottom direction information is 0°, the processing is finished without the rotation processing being carried out. However, an embodiment of the present invention can be implemented without creating the top-to-bottom direction information in the document detection section 21. The following description deals with an embodiment in which the top-to-bottom direction information is unnecessary.

In the fifth embodiment, in addition to rotation angles of 90°, 180°, and 270°, a rotation angle of 0° also can be set. In the fifth embodiment, like the third embodiment, a document 300 and an instruction mark 201 are shown for each of the settable rotation angles (0°, 90°, 180°, 270°) in a display image 350h displayed on the display apparatus 11, as illustrated in FIG. 12.

Figure 12:
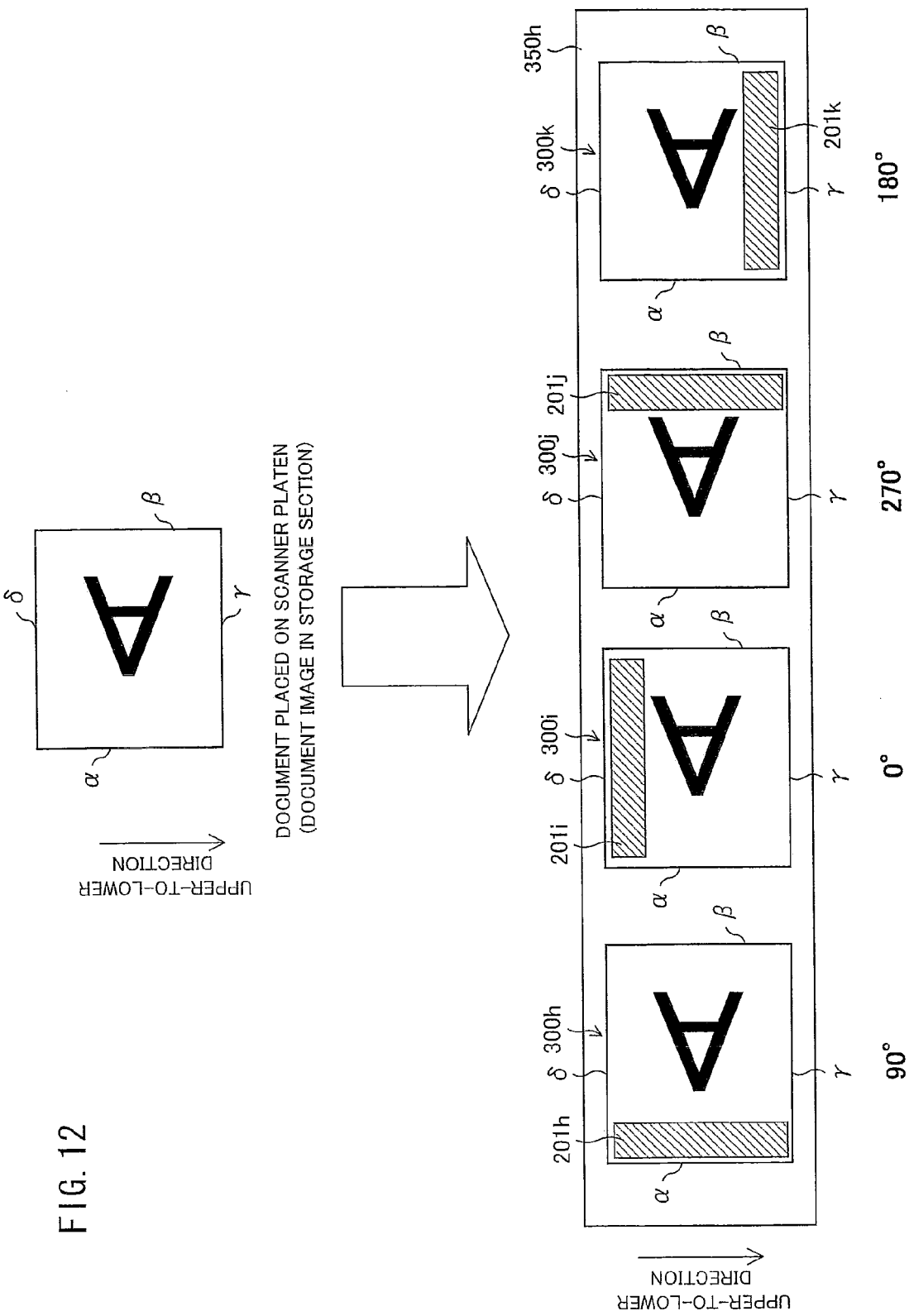
FIG. 12 is a view explaining processing carried out in a fifth embodiment.

More specifically, since there are four settable rotation angles in the image processing apparatus 10 of the present embodiment, four documents 300 are shown in the display image 350h displayed on the display apparatus 11, as illustrated in FIG. 12.

Further, in the example illustrated in FIG. 12, a top-to-bottom direction of a document shown in the document image stored in the storage section 12 is inclined at 90° against an upper-to-lower direction of the document image. Meanwhile, on the display apparatus 11, an instruction mark 201h corresponding to the rotation angle of 90° and the document 300h overlap each other so that the instruction mark 201h indicates a top side α of the document 300h, an instruction mark 201i corresponding to the rotation angle of 0° and the document 300i overlap each other so that the instruction mark 201i indicates a right side δ of the document 300i, an instruction mark 201j corresponding to the rotation angle of 270° and the document 300j overlap each other so that the instruction mark 201j indicates a bottom side β of the document 300j, and an instruction mark 201k corresponding to the rotation angle of 180° and the document 300k overlap each other so that the instruction mark 201k indicates a left side γ of the document 300k.

If a user touches the instruction mark 201h, the document correction section 23 reads out the document image stored in the storage section 12, and carries out the rotation processing (at the rotation angle of 90°) with respect to the document image so that the top-to-bottom direction (the direction from the top side α to the bottom side β) of the document coincides with the upper-to-lower direction of the document image which has been subjected to the rotation processing. Further, if a user touches the instruction mark 201i, the document correction section 23 carries out the rotation processing at the rotation angle of 0° (that is, the rotation processing is not carried out). Furthermore, if a user touches the instruction mark 201j, the document correction section 23 reads out the document image stored in the storage section 12, and carries out the rotation processing (at the rotation angle of 270°) with respect to the document image so that a direction from the bottom side β of the document shown in the document image to the top side α of the document coincides with the upper-to-lower direction of the document image which has been subjected to the rotation processing. Moreover, if a user touches the instruction mark 201k, the document correction section 23 reads out the document image stored in the storage section 12, and carries out the rotation processing (at the rotation angle of 180°) with respect to the document image data so that a direction from the left side γ of the document shown in the document image, to the right side δ of the document coincides with the upper-to-lower direction of the document image which has been subjected to the rotation processing.

That is, in the present embodiment, too, the document correction section 23 carries out the rotation processing so that the first reference direction from the document's reference side indicated by the instruction mark touched by the user, to the opposite side of the reference side coincides with the upper-to-lower direction of the document image which has been subjected to the rotation processing. Therefore, each of the instruction marks 201h, 201i, 201j, and 201k, which are shown in the display image 350h illustrated in FIG. 12, indicates a top side (a side of a document) of the document image that has been subjected to the rotation processing. In other words, in a case where the rotation processing is carried out with respect to the document image so that the first reference direction from the reference side of the document to the opposite side of the reference side coincides with the upper-to-lower direction of the document image which has been subjected to the rotation processing, each of the instruction marks 201h, 201i, 201j, and 201k indicates the reference side to a user before the rotation processing is carried out.

Figure 13:
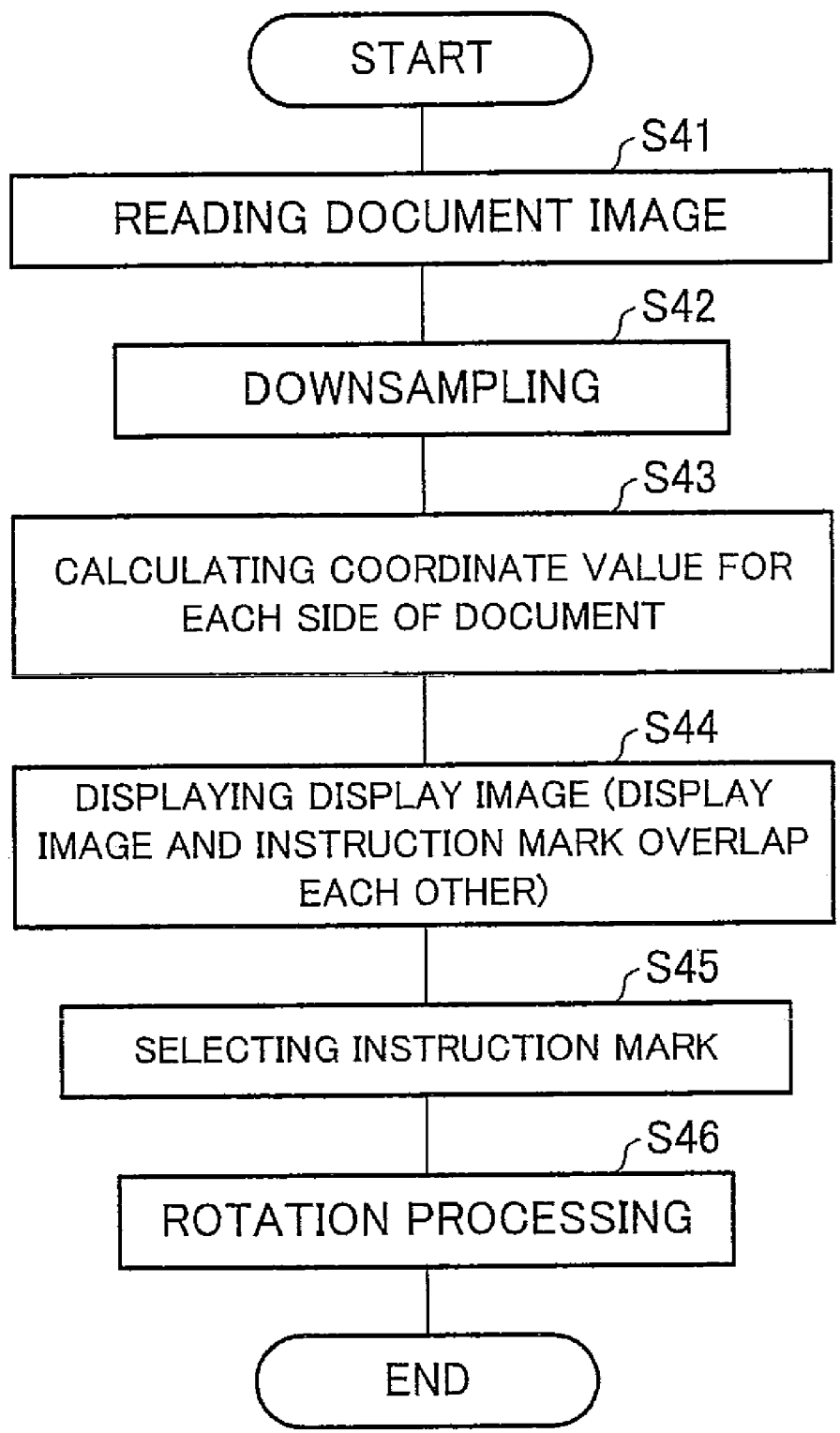
FIG. 13 is a flow chart illustrating a flow of the processing carried out in the fifth embodiment.

Next, the following description deals with a procedure of the processing carried out in the present embodiment with reference to FIG. 13. FIG. 13 is a flow chart illustrating a flow of the processing carried out in the fifth embodiment.

As illustrated in FIG. 13, if document image data is read by the image input apparatus (scanner) (S41), the display control section 22 downsamples the read document image data (S42). After S42, the display control section 22 calculates, for each of the settable rotation angles, a position (coordinate) where the document image that has been downsampled and an instruction mark overlap each other (S43). Here, in the present embodiment, coordinate values of instruction marks for indicating respective sides of a document are calculated. That is, in the example illustrated in FIG. 12, the coordinate value of the instruction mark is calculated for each of the top side α, the bottom side β, the left side γ, and the right side δ. The coordinate values can be calculated by use of the procedure described in the first embodiment.

Further, the display control section 22 causes the display apparatus 11 to display the display image 350h in which the documents 300h through 300k and the instruction marks 210h through 201k are shown for the respective settable rotation angles so that the documents and the instruction marks overlap each other, respectively, (S44).

After S44, if a user touches (selects) any one of the instruction marks 201h through 201k (S45), the document correction section 23 reads out the document image stored in the storage section 12, and carries out the rotation processing with respect to the read-out document image (S46). Here, the rotation processing is carried out so that the first reference direction from the document's reference side indicated by the instruction mark selected by the user, to the opposite side of the reference side coincides with the upper-to-lower direction of the document image which has been subjected to the rotation processing. After S46, the document correction section 23 finishes the processing.

In S45, a user may not touch one of the instruction marks 201h through 201k but the user may touch a region where one of the documents 300h through 300k is shown. For example, in FIG. 12, if a user touches the document 300h corresponding to the instruction mark 201h, the rotation processing may be carried out with respect to the document image so that the direction (indicated by the instruction mark 201h) from the top side α to the bottom side β coincides with the upper-to-lower direction of the document image which has been subjected to the rotation processing.

Sixth Embodiment

Next, the following description deals with a sixth embodiment, which is different from the first, second, third, fourth, and fifth embodiments. The sixth embodiment corresponds to a combination of the second embodiment and the fifth embodiment. That is, in the sixth embodiment, the document detection section 21 does not create top-to-bottom direction information. Further, in the sixth embodiment, a display image 350m displayed on the display apparatus 11 is the one that has been subjected to provisional rotation processing.

For example, a top-to-bottom direction of a document shown in a document image stored in the storage section 12 is inclined at 90° against an upper-to-lower direction of the document image. In this case, as illustrated in FIG. 14, documents 300m, 300n, 300o, and 300p, which have been subjected to the provisional rotation processing at respective rotation angles of 0°, 90°, 180°, and 270°, are shown in the display image 350m displayed on the display apparatus 11.

Further, instruction marks 201m through 201p are shown in the respective documents 300m through 300p shown in the display image 350m. The instruction mark 201m corresponding to the rotation angle of 90° and the document 300m overlap each other so that the instruction mark 201m indicates a top side α of the document 300m, the instruction mark 201n corresponding to the rotation angle of 0° and the document 300n overlap each other so that the instruction mark 201n indicates a right side δ of the document 300n, the instruction mark 201*o* corresponding to the rotation angle of 270° and the document 300*o* overlap each other so that the instruction mark 201*o* indicates a bottom side β of the document 300*o*, and the instruction mark 201*p* corresponding to the rotation angle of 180° and the document 300*p* overlap each other so that the instruction mark 201*p* indicates a left side γ of the document 300*p*.

Figure 14:
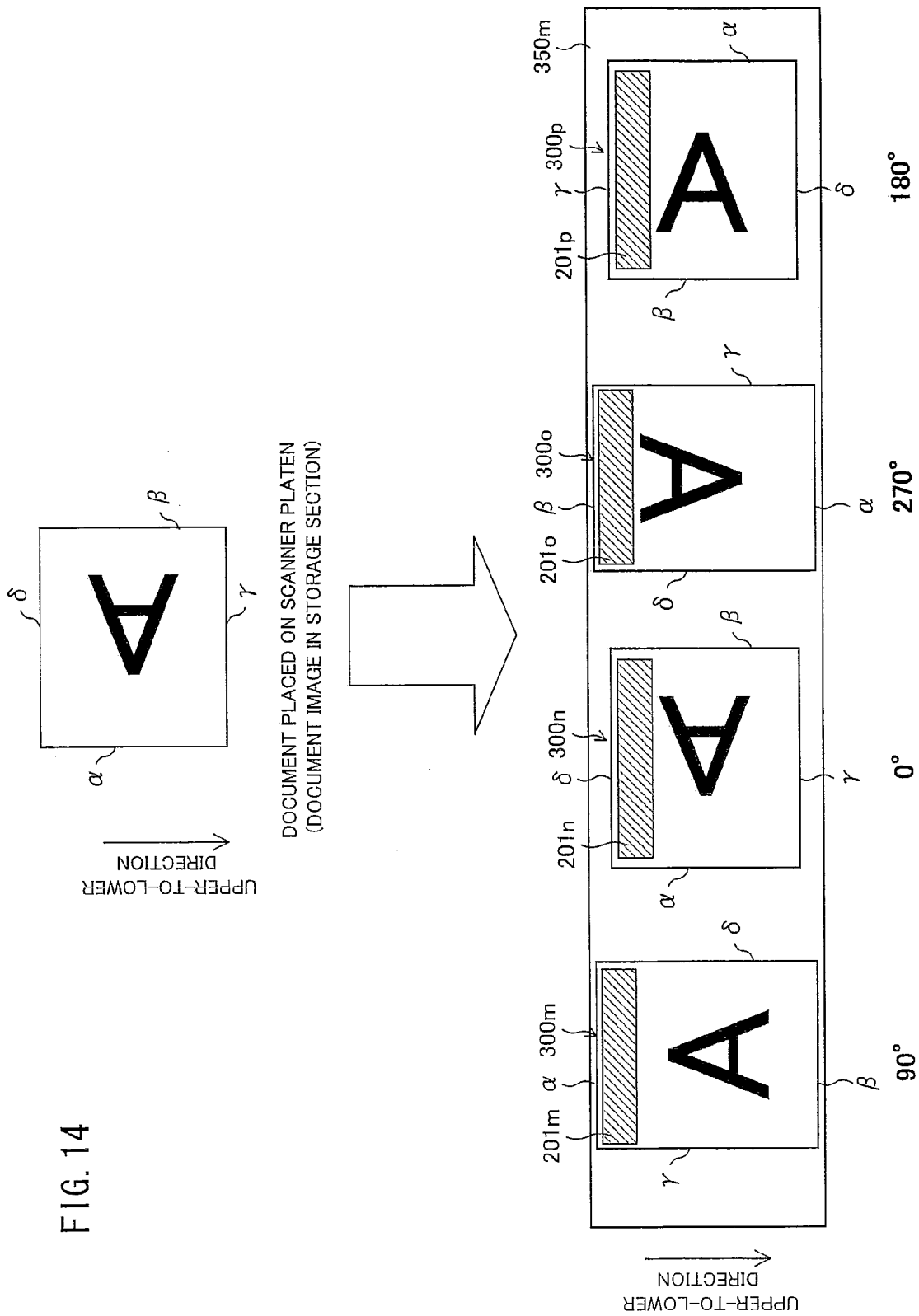
FIG. 14 is a view explaining processing carried out in a sixth embodiment.

Here, each of the documents 300*m* through 300*p* illustrated in FIG. 14 is a document image that has been subjected to the provisional rotation processing. Accordingly, in a case where the rotation processing is carried out with respect to the document image data so that the first reference direction from the reference side of the document to the opposite side of the reference side coincides with the upper-to-lower direction of the document image which has been subjected to the rotation processing, each of the instruction marks 201*m* through 201*p* in FIG. 14 is shown in such a position that the instruction mark indicates the reference side.

That is, if a user touches the instruction mark 201*m*, the rotation processing (at the rotation angle of 90° in a clockwise direction) is carried out with respect to the document image stored in the storage section 12 so that the top-to-bottom direction (the direction from the top side α to the bottom side β) of the document coincides with the upper-to-lower direction of the document image which has been subjected to the rotation processing. If a user touches the instruction mark 201*n*, the document correction section 23 carries out the rotation processing at the rotation angle of 0° (that is, the rotation processing is not carried out). Further, if a user touches the instruction mark 201*o*, the rotation processing (at the rotation angle of 270° in the clockwise direction) is carried out with respect to the document image stored in the storage section 12 so that the direction from the bottom side β of the document to the top side α of the document coincides with the upper-to-lower direction of the document image which has been subjected to the rotation processing. Furthermore, if a user touches the instruction mark 201*p*, the rotation processing (at the rotation angle of 180° in the clockwise direction) is carried out with respect to the document image stored in the storage section 12 so that the direction from the left side γ of the document to the right side δ of the document coincides with the upper-to-lower direction of the document image which has been subjected to the rotation processing.

Figure 15:
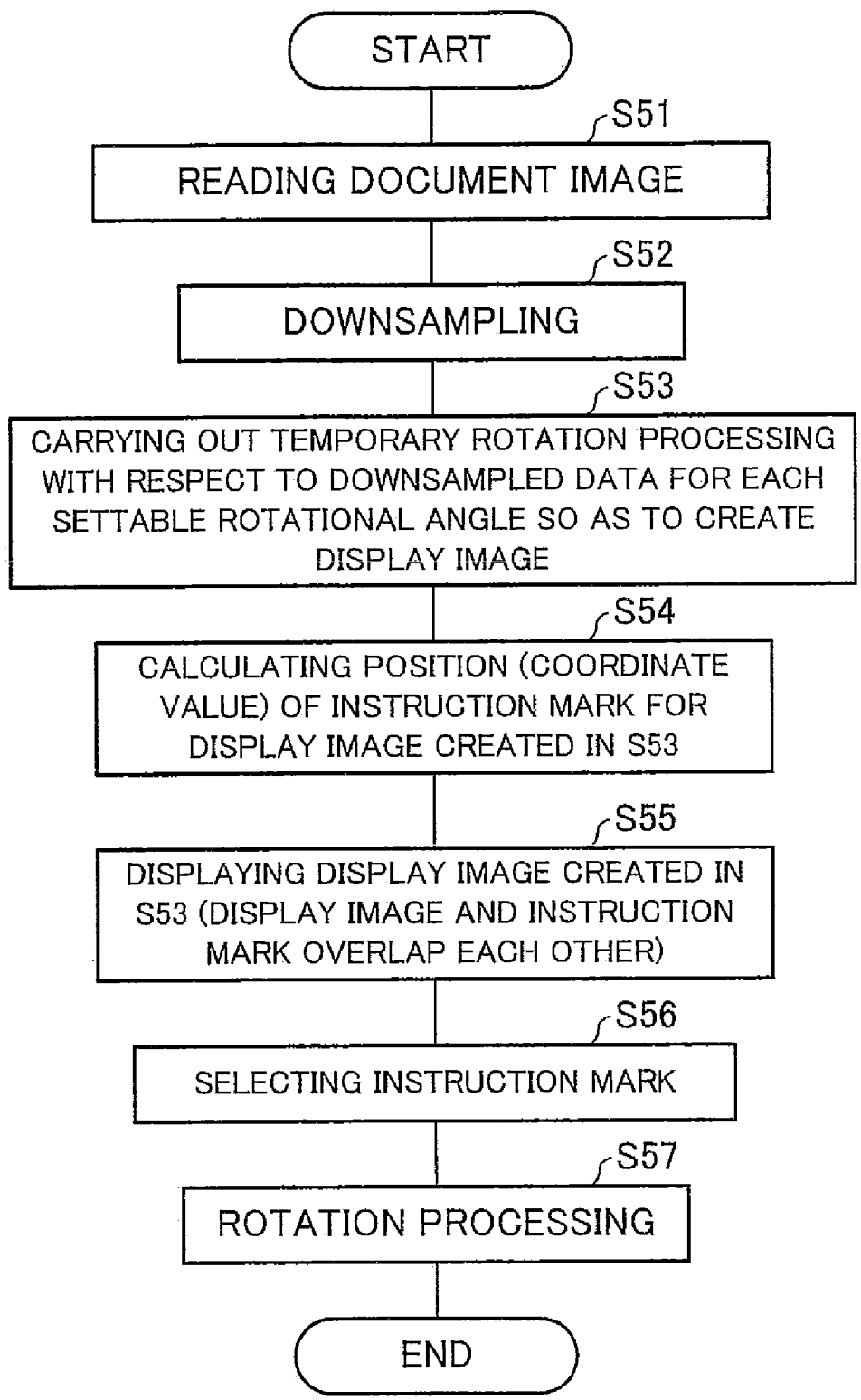
FIG. 15 is a flow chart illustrating a flow of the processing carried out in the sixth embodiment.

Next, the following description deals with a procedure of the processing carried out in the present embodiment with reference to FIG. 15. FIG. 15 is a flow chart illustrating a flow of the processing carried out in the present embodiment.

As illustrated in FIG. 15, if a document image is read by the image input apparatus (scanner) (S51), the display control section 22 downsamples the read document image (S52). After S52, the display control section 22 carries out provisional rotation processing, at each of settable rotation angles, with respect to the document image that has been downsampled, so as to create data of the display image 350*m* illustrated in FIG. 14 (S53). That is, since there are four settable rotation angles in the image processing apparatus 10 of the present embodiment, the display control section 22 creates the display image 350*m* in which four documents that have been subjected to the provisional rotation processing are shown.

Next, for each of the documents 300*m* through 300*p* of the display image 350*m*, the display control section 22 calculates a position (coordinate) where an instruction mark and the document overlap each other (S54). Here, for each of the documents 300*m* through 300*p* of the display image 350*m*, the position is required to be in contact with a side on an upper part of the display image 350*m*.

Further, the display control section 22 causes the display apparatus 11 to display the display image 350*m* in which the documents 300*m* through 300*p* and the instruction marks 201*m* through 201*p* are shown for the respective settable rotation angles so that the documents and the instruction marks overlap each other, respectively, (S55).

After S55, if a user touches (selects) any one of the instruction marks 201*m* through 201*p* (S56), the document correction section 23 reads out the document image stored in the storage section 12, and carries out the rotation processing with respect to the read-out document image (S57). Here, the rotation processing is carried out so that the first reference direction from the document's reference side indicated by the instruction mark selected by the user, to the opposite side of the reference side coincides with the upper-to-lower direction of the document image which has been subjected to the rotation processing. After S57, the document correction section 23 finishes the processing.

Seventh Embodiment

In the first, second, third, fourth, fifth, and sixth embodiments, one document is processed. The following description deals with an embodiment in which a plurality of documents are read collectively, with reference to FIGS. 2(*a*) through 2(*c*), and FIG. 16.

Figure 16:
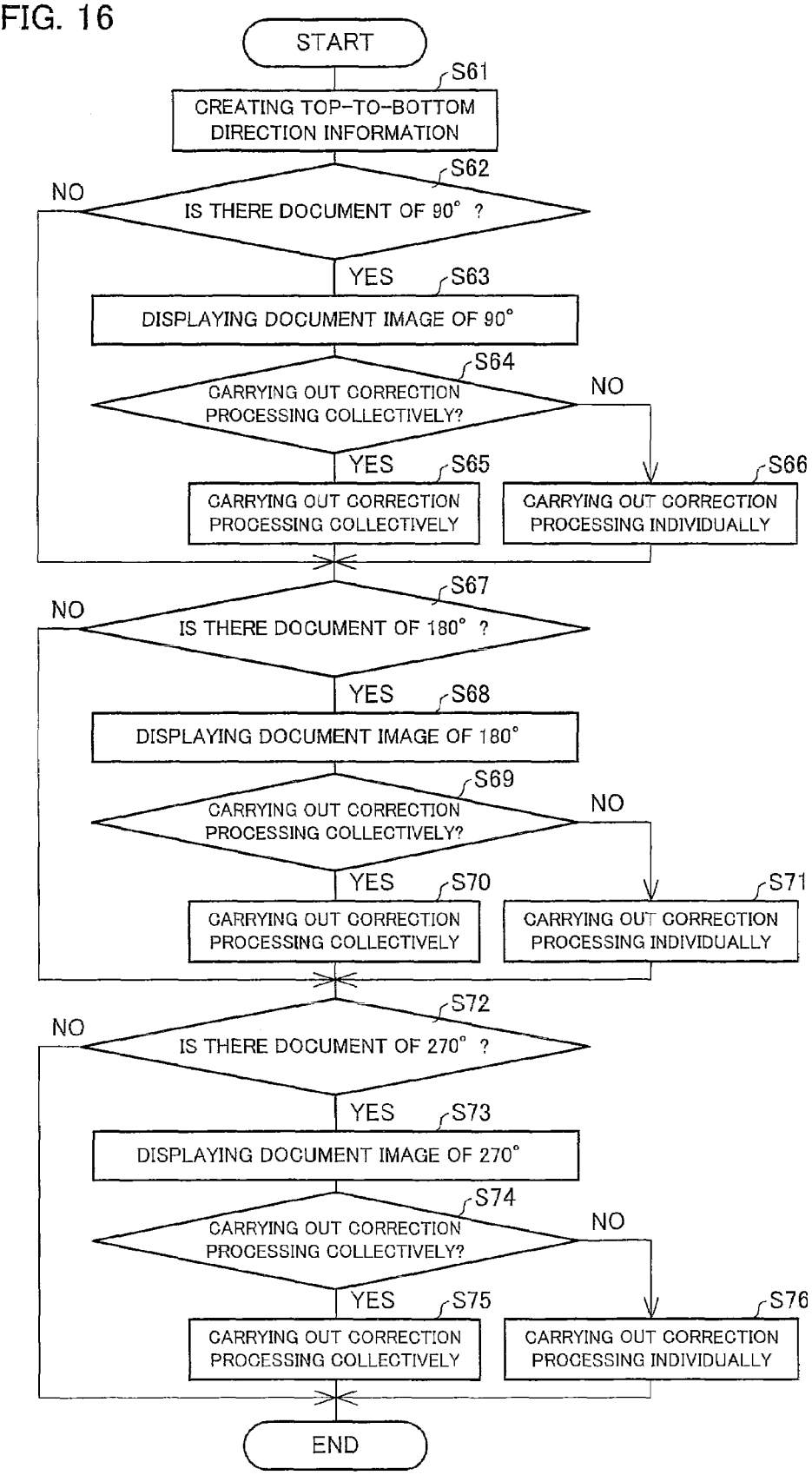
FIG. 16 is a flow chart illustrating a flow of the processing carried out in the seventh embodiment.

As illustrated in FIG. 16, if a plurality of documents are read collectively, the document detection section 21 creates top-to-bottom direction information for each of the documents (S61), and stores the top-to-bottom direction information in the storage section 12 so that each of the document is associated with the top-to-bottom direction information. In the present embodiment, six documents illustrated in FIG. 2(*a*) are read. Further, as illustrated in FIG. 2(*a*), among the six documents, two documents have the top-to-bottom direction information of 0°, two documents have the top-to-bottom direction information of 90°, and two documents have the top-to-bottom direction information of 180°.

Next, the display control section 22 determines whether or not the six documents written into the storage section 12 include a document image whose top-to-bottom direction information is 90° (S62). Here, if the document image whose top-to-bottom direction information is 90° is not included ("No" in S62), the processing proceeds to S67.

If there is the document image whose top-to-bottom direction information is 90° ("Yes" in S62), the display control section 22 causes the display apparatus 11 to display the document image whose top-to-bottom direction information is 90° (S63). In the present embodiment, since there are two document images whose top-to-bottom direction information of 90°, two documents 360 and 361 are displayed, as illustrated in FIG. 2(*b*).

Figure 2:
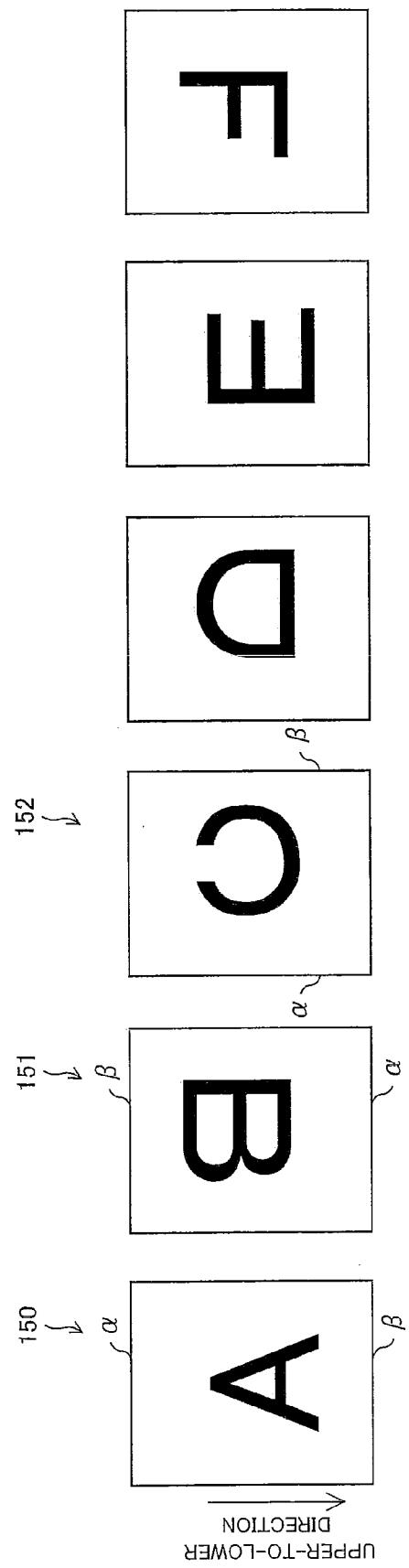
FIG. 2(a) is a view illustrating six documents read in a seventh embodiment.
FIG. 2(b) is a view explaining processing carried out in the seventh embodiment, illustrating a display example of a document image whose top-to-bottom direction information is 90°.
FIG. 2(c) is a view explaining the processing carried out in the seventh embodiment, illustrating a display example of a document image whose top-to-bottom direction information is 180°.
Figure 2:
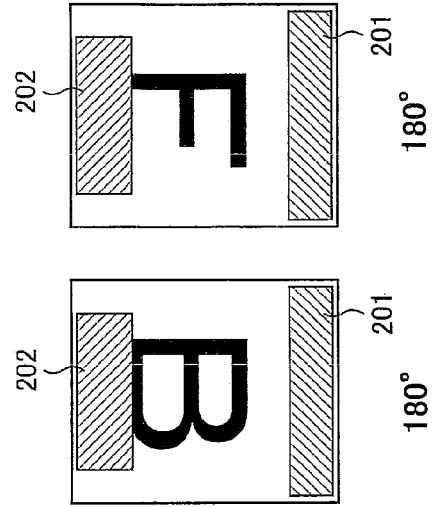
Figure 2:
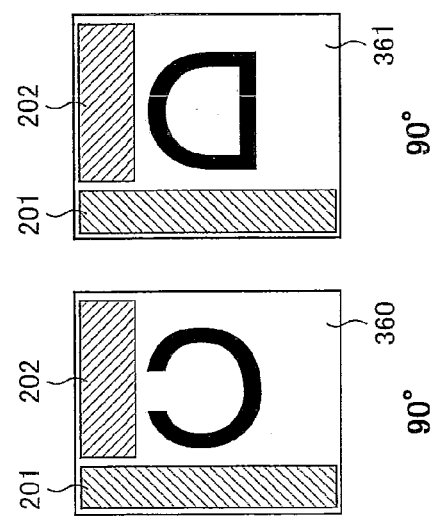

Here, in the present embodiment, as illustrated in FIG. 2(*b*), each of the documents 360 and 361 is displayed so that (i) the document and the instruction mark 201 overlap each other, and also (ii) the document and a selection mark 202 overlap each other. The selection mark 202 is a button for a user to select target documents to be subjected to the rotation processing in a case where the rotation processing is carried out collectively with respect to a plurality of document image data. For example, in FIG. 2(*b*), if a user (i) pushes the selection mark 202 of the document 360 and the selection mark 202 of the document 361, and then (ii) pushes the instruction mark 201 of the document 360 or the instruction mark 201 of the document 361, the rotation processing is carried out collectively with respect to the document image of the document 360 and the document image of the document 361.

If the rotation processing is carried out collectively with respect to the documents 360 and 361 illustrated in FIG. 2(*b*) (S64, S65), the processing proceeds to S67. Alternatively, it is possible to carry out the rotation processing with respect to each of the documents 360 and 361 independently by pushing the instruction mark 201 of the document 360 or the document 361 without pushing the selection marks of the documents 360 and 361 (S64, S66).

Furthermore, in S67 through S71, as illustrated in FIG. 16, the processing carried out in S61 through S66 is repeated with respect to the document images whose top-to-bottom direction information is 180°. In the present embodiment, since there are document images whose top-to-bottom direction information is 180°, the documents whose top-to-bottom direction information is 180° are displayed, as illustrated in FIG. 2(*c*). Moreover, in S72 through S76, the processing carried out in S61 through S66 is repeated with respect to the document images whose top-to-bottom direction information is 270°. Then, the processing is finished.

As illustrated in FIG. 2(*b*) and FIG. 2(*c*), in the present embodiment, the document image and the instruction mark 201 overlap each other, and the document image and the selection mark 202 overlap each other as well. The following description deals with a method of calculating a coordinate value of the selection mark. As illustrated in FIG. 3, the selection mark 202 is set in such a rectangle region that (i) a third coordinate (ta2_x0,ta2_y0) and a fourth coordinate (ta2_x1,ta2_y1) are provided as vertexes, and (ii) a straight line between the third coordinate and the fourth coordinate is a diagonal line of the rectangle region.

$$ta2\_x0 = ta1\_offset + 1 \qquad \text{Formula (5)}$$

$$ta2\_y0 = 0 \qquad \text{Formula (6)}$$

$$ta2\_x1 = size\_x - 1 \qquad \text{Formula (7)}$$

$$ta2\_y1 = ta2\_offset \qquad \text{Formula (8)}$$

Then, the coordinate values of the third coordinate and the fourth coordinate are obtained based on the above formulas (5) through (8).

[Image Forming Apparatus]

Figure 17:
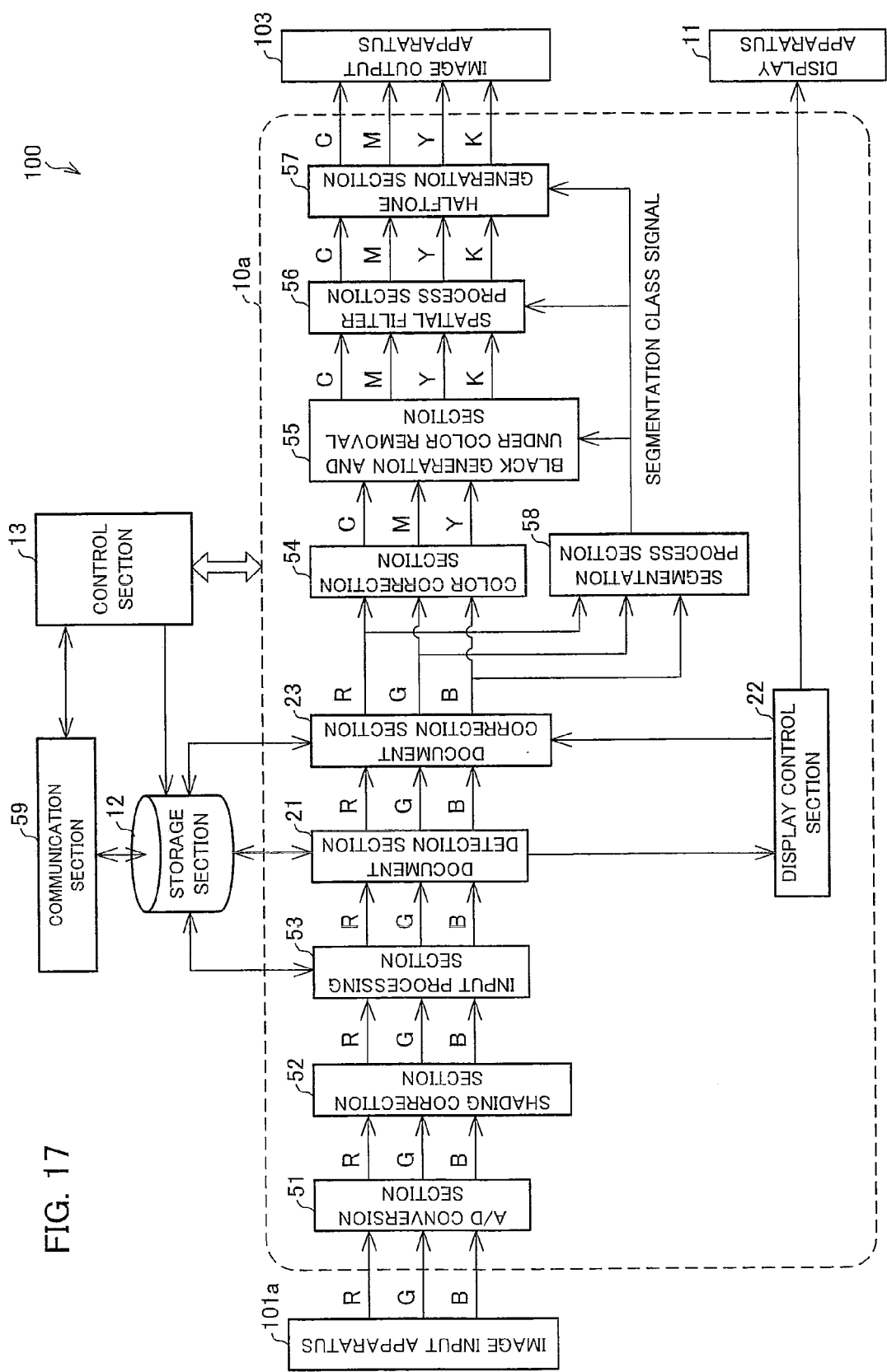
FIG. 17 is a block diagram illustrating an arrangement of an image forming apparatus including an image processing apparatus of the present embodiment.

Next, the following description deals with an image forming apparatus including an image processing apparatus 10 of the first embodiment described above. FIG. 17 is a block diagram illustrating an image forming apparatus (a copying machine or a multifunction printer). The multifunction printer has a function of a digital copying machine, a function of a copying machine, a function of a printer, a function of fax transmission, and a function of scanning to e-mail, for example. In FIG. 17, the image processing apparatus 10 is referred to as an image processing apparatus 10*a*.

As illustrated in FIG. 17, an image forming apparatus 100 includes an image input apparatus (color image input apparatus) 101*a*, an image processing apparatus (color image processing apparatus) 10*a*, and an image output apparatus (color image output apparatus) 103.

The image input apparatus 101*a* is constituted by a CCD (Charge Coupled Device) line sensor, and converts light reflected from a document into an electric signal indicating each color component of R, G, and B (R: red, G: green, B: blue) of the light. The color image signal (RGB analogue signals) outputted from the line sensor is converted into a digital signal in an A/D (analogue-to-digital) conversion section 51, and then various distortion generated in an illumination system, an image focusing system, and an image sensing system of the image input apparatus 101*a* is removed in a shading correction section 52. After that, processing, such as gamma correction processing, is carried out with respect to each of the RGB signals in an input processing section 53.

The data outputted from the input processing section 53 is received by a storage section 12. A document detection section 21 creates said top-to-bottom direction information based on the image data read out of the storage section 12. The read-out document image data is downsampled and subjected to processing of creating an instruction mark. Thus, a document image is obtained. A display control section 22 causes a display apparatus 11 to display the document image. If a user touches the instruction mark displayed on the display apparatus 11, a document correction section 23 reads out the document image data stored in the storage section 12, and carries out rotation processing with respect to the read-out document image data. After that, the document correction section 23 overwrites the document image data stored in the storage section 12 with the document image data that has been subjected to the rotation processing.

At stages following the document correction section 23, image processing, such as color correction processing, is carried out with respect to the image data written into the storage section 12, as described below. In a color correction section 54, CMY (C: cyan, M: magenta, Y: yellow) signals (which are complementary colors of the RGB signals) are generated, and also processed to have an increase in color reproducibility. In a black generation and under color removal section 55, the signals are converted into four CMYK (K: black) signals. With respect to the CMYK signals, enhancement processing, smoothing processing, and the like are carried out in a spatial filter process section 56, and then, tone reproduction processing for outputting an image is carried out in a halftone generation section 57.

Meanwhile, in a segmentation process section 58, it is determined which region (a black text, a color text, a halftone dot, or a photograph (a continuous tone image region), for example) each pixel of the input image data belongs to. The segmentation process section 58 outputs segmentation class signal to the black generation and under color removal section 55, the spatial filter section 56, and the halftone generation section 57, and the processing is appropriately switched over in accordance with various regions.

The halftone generation section 57 outputs the CMYK signals to an image output apparatus 103, and then an output image is formed (printed) on a sheet. The image output apparatus 103 is an apparatus for forming (printing) an image for an electrophotographic printer or an ink jet printer, for example. The display apparatus 11 is an apparatus for displaying an image on, for example, a liquid crystal display attached to an operation panel of an image forming apparatus 100.

Further, image data stored in the storage section 12 may be converted into, for example, a PDF file format, and may be transferred to, via a network or a communication line, an external connection line or a communication line. This transfer is controlled by a communication section 59 illustrated in FIG. 17.

Further, after a top-to-bottom direction of a document is determined, and an orientation of the document is corrected as appropriate, the image data may be stored and managed in the storage section 12 as filing data. In this case, the image data is stored in such a manner that the image data is encoded into a JPEG code based on a JPEG compressing algorithm, for example. Then, in a case where a copy output operation or a print output operation is inputted, the JPEG code is extracted from the storage section 12. After that, the JPEG code is received by a JPEG decoding section, and is decoded so as to be converted into RGB data. Meanwhile, in an image transmission operation, the JPEG code is extracted from the storage section 12, and then is transferred to, via a network or a communication line, an external connection apparatus or a communication line. A control section manages the filing data, and controls operation of transferring data.

[Image Reading Apparatus]

Figure 18:
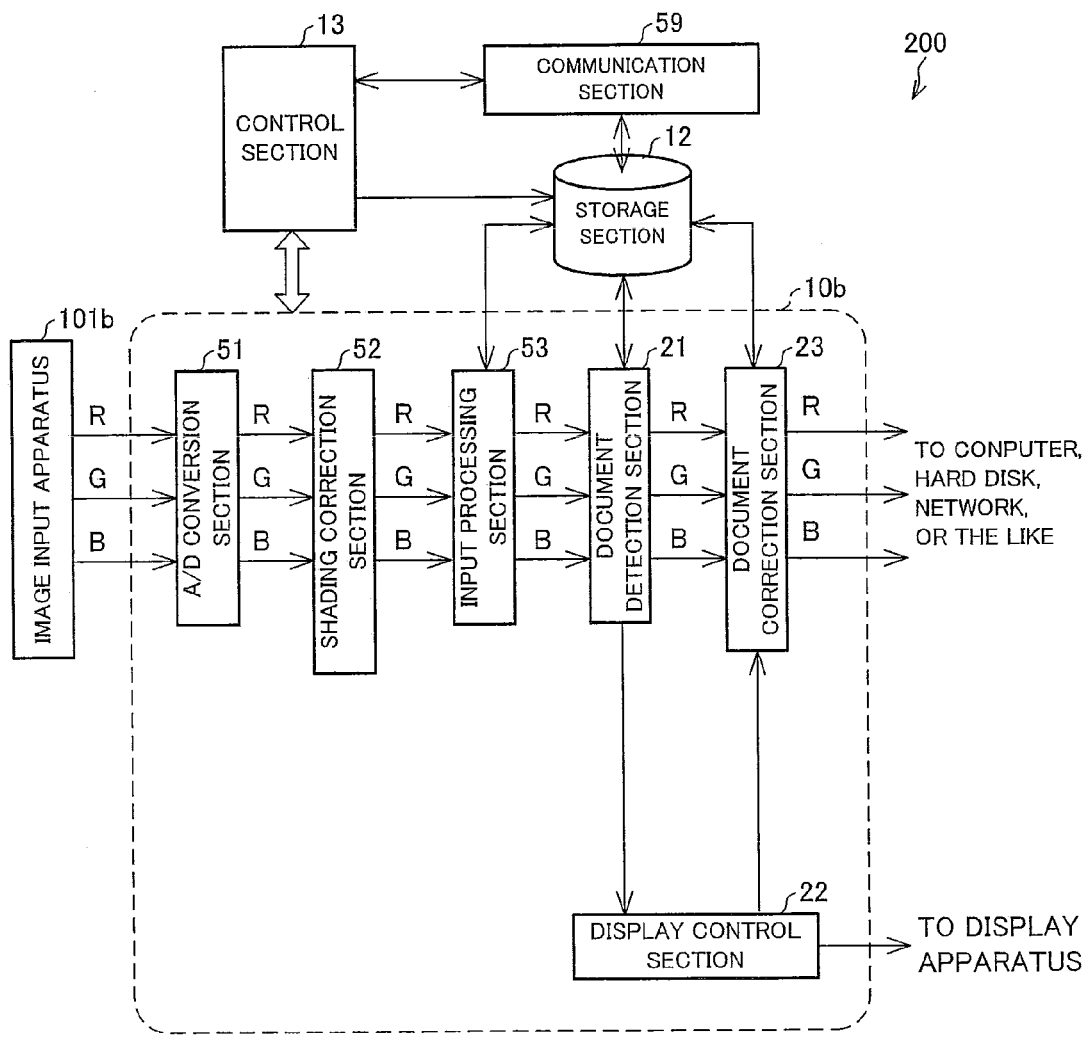
FIG. 18 is a block diagram illustrating an arrangement of an image reading apparatus including the image processing apparatus of the present embodiment.

Next, the following description deals with an image reading apparatus (scanner) including any one of the image processing apparatuses 10 described in the aforementioned embodiments. FIG. 18 is a block diagram illustrating an image reading apparatus. In FIG. 18, the image processing apparatus 10 is referred to as an image processing apparatus 10b.

As illustrated in FIG. 18, an image reading apparatus 200 includes an image input apparatus 101b, and the image processing apparatus 10b. The image processing apparatus 10b includes an A/D conversion section 51, a shading correction section 52, an input processing section 53, a document detection section 21, and a document correction section 23. An arrangement of the image input apparatus 101b is the same as that of the image input apparatus 101a illustrated in FIG. 17. Further, the processing carried out in each processing section of the image processing apparatus 10b is also the same as the processing carried out in each processing section of the image processing apparatus 10a.

After being processed in various processing sections of the image processing apparatus 10b, the RGB image signals are outputted to a computer, a hard disk, or a network, for example. Further, a display control section 22 calculates a coordinate value of a region (instruction region) indicating a direction (correction direction) in which a document image is rotated. After downsampling the image data, the display control section 22 causes the display apparatus to display the image data so that the instruction region and the image data overlap each other. In accordance with an instruction inputted by a user, the image data is processed so that the orientation of the document is corrected. And then, the image data is outputted to the display apparatus. A display for displaying the image data may be attached to a scanner itself.

[Image Input Apparatus]

Next, the following description deals with said image input apparatuses 101a and 101b. Since the image input apparatuses 101a and 101b have the same arrangement, hereinafter, the image input apparatuses 101a and 101b are referred to as "image input apparatus 101".

Figure 19:
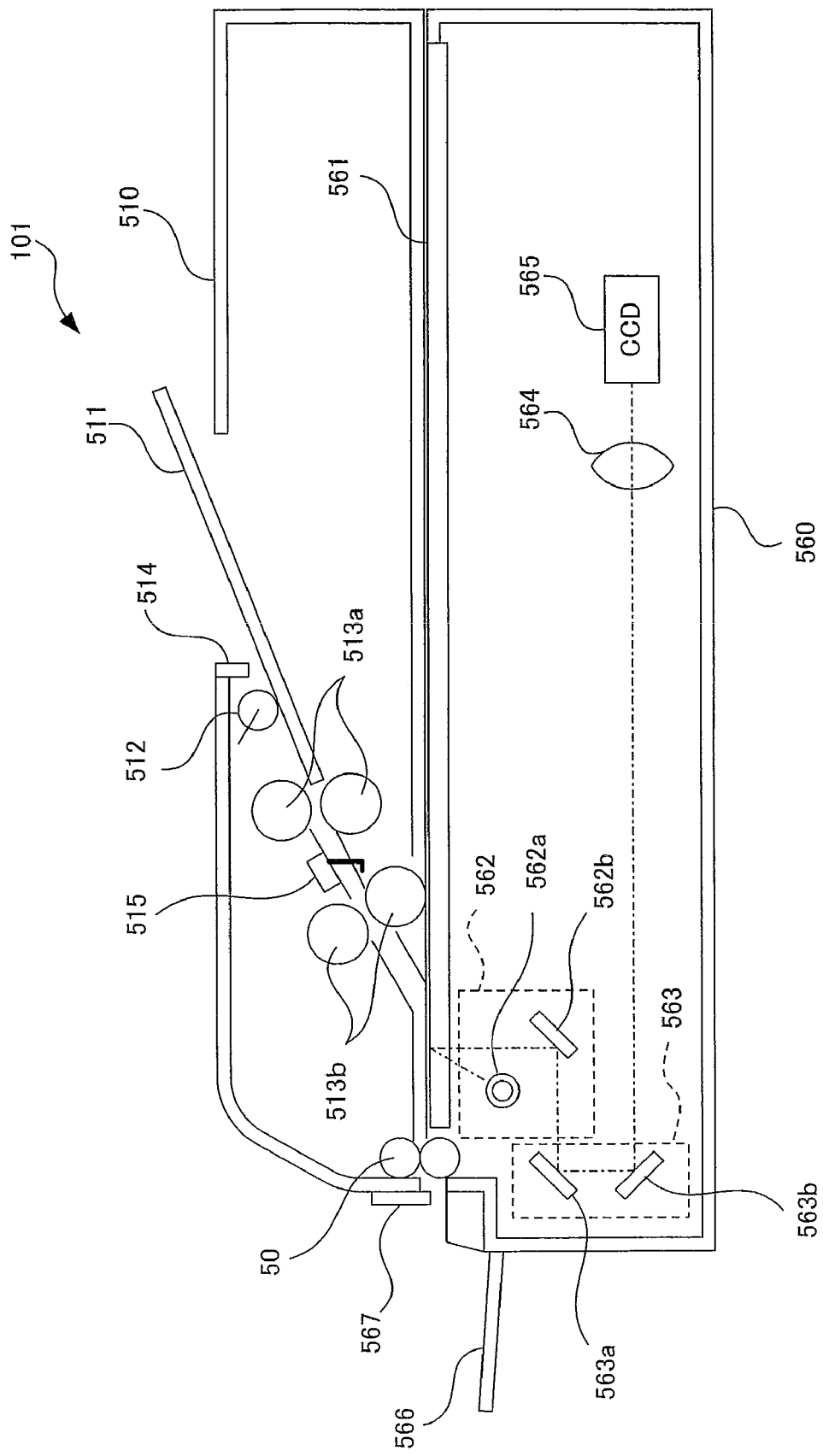
FIG. 19 is a view schematically illustrating an arrangement of an image input apparatus illustrated in FIGS. 17 and 18.

FIG. 19 is a view schematically illustrating an arrangement of the image input apparatus 101. The image input apparatus 101 includes: a document feeding section including an upper housing 510; a scanner section including a lower housing 560; and the like. The upper housing 510 includes: a document set sensor 514 for detecting a document placed on a document tray 511; a pick-up roller 512 for conveying documents one by one; conveyance rollers 513a and 513b for conveying a document so that an image of the document is read; a document delivery roller 50 for delivering a document; a document output tray 566 on which a delivered document is placed; a document delivery sensor 567 for detecting a delivered document; and the like. The conveyance roller 513b functions as an alignment roller for adjusting an orientation of a sheet. A driving shaft of the conveyance roller 513b includes an electromagnetic clutch (not illustrated). A control circuit (not illustrated) controls the electromagnetic clutch so as to control transfer of driving force from a drive motor (not illustrated) to the conveyance roller 513b. In a case where no document is provided, the conveyance roller 513b is not in operation. If a front end of a document touches a feeding timing sensor 515, and a predetermined signal is transferred from the sensor to the control circuit, the conveyance roller 513b starts its rotation operation so as to transport the document in a direction from the document tray 511 to the output tray 566. The conveyance roller 513b is set such that, when (i) a document is transported from an upstream section, and a front end of the document is pressed against a nip section of the conveyance roller 513b that is not in operation, and (ii) the document is bent, the conveyance roller 513b starts its rotation operation. This corrects a position of the document in such a manner that the nip section of the conveyance roller 513b causes the front end of the document to be perpendicular to a conveyance direction.

The lower housing 560 includes: scan units 562 and 563 which reciprocate along a lower surface of a scanner platen 561; an imaging lens 564; a CCD line sensor 565 which is a photoelectric conversion element; a paper output tray 566; and the like.

The scan unit 562 includes: a light source 562a (a halogen lamp, for example) for irradiating light toward a document conveyed from the document tray 511, or a document placed on the scanner platen 561; a mirror 562b for leading light reflected from the document to a predetermined light path; and the like. Further, the scan unit 563 includes mirrors 562a and 563b for leading, toward the CCD line sensor 565, the light that was reflected from the document and then lead by the mirror 562b to the predetermined light path.

The imaging lens 564 leads the reflected light from the scan unit 563 and forms an optical image on a predetermined position on the CCD line sensor 565. The CCD line sensor 565 carries out the photoelectric conversion with respect to the formed optical image, and outputs an electric signal. In other words, the CCD line sensor 565 outputs, to the image processing apparatus 10, data that has been color-separated into each of color components R (red), G (green), and B (blue) in accordance with a color image read from the document (a surface of the document, for example).

[Program]

The present embodiment can be realized by storing, in a computer-readable recording medium that can store a program code (an execution format program, an intermediate code program, a source program) to be carried out by a computer, a program for causing a computer to carry out the processing of the document detection section 21, the processing of the display control section 22, and processing of the document correction section 23. As a result, it becomes possible to provide a portable recording medium in which the program for carrying out the image processing method described above is stored. In the present embodiment, the recording medium may be a memory (not illustrated) itself, such as a ROM, used in processing carried out by a microcomputer, or such a program medium that (i) a program reading apparatus is provided an external storage apparatus (not illustrated), and (ii) the program medium is inserted into the program reading apparatus so that the program is read. In any cases, it is possible to have an arrangement in which a microprocessor accesses the program code so as to perform the program code. Alternatively, in any cases, it is possible to have an arrangement in which (i) the program code is read out and downloaded to a program storage area (not illustrated) of a microcomputer, and (ii) the program code is performed. The program for downloading the program code is stored in a main apparatus in advance. Here, the program medium may be a recording medium that is arranged separable from the main apparatus. The program medium may be a medium in which a program code is supported and fixed, such as: a tape (such as a magnetic tape or a cassette); a disc such as a magnetic disk (a floppy disk, or a hard disk, for example) or an optical disk (a CD-ROM, an MO, an MD, or a DVD, for example); a card (such as an IC card (including a memory card) or an optical card); and a semiconductor memory (such as a mask ROM, an EPROM (Erasable Programmable Read Only Memory), an EEPROM (Electrically Erasable Programmable Read Only Memory), or a flash ROM).

Further, in the present embodiment, a system is arranged such that (i) the system can be connected to a communication network including the Internet, and (ii) the program code may be supported but not fixed in a medium (the program code may be downloaded from a communication network, for example). In the case where the program code is downloaded from a communication network, the program for downloading the program code may be stored in the main apparatus in advance, or may be installed from another recording medium to the main apparatus. Further, the present invention can be realized in a form of a computer data signal that is realized by electronic transmission of the program code, and embedded in a carrier wave. The program stored in the recording medium is read out by a program reading apparatus included in a digital color image forming apparatus or a computer system, so that said image processing method is carried out.

A computer system includes: an image input apparatus (such as a flat head scanner, a film scanner, or a digital camera); a computer in which a predetermined program is loaded so as to carry out various processing (said image processing method, for example); an image display apparatus (such as a CRT display or a liquid crystal display) for displaying a result of processing of a computer; and a printer for outputting the result of the processing of the computer on paper or the like. The computer system further includes communication means (such as a network card or a modem) for connecting the computer system to a server or the like via a network.

As described above, an image processing apparatus of the present invention includes: a rotation processing section for carrying out rotation processing with respect to a document image in which a document is shown, so that a first reference direction from a reference side of the document to a side facing the reference side coincides with a second reference direction of the document image which has been subjected to the rotation processing; and a display control section for causing a display apparatus to display, before the rotation processing is carried out, a display image in which (i) the document, and (ii) a mark indicating the reference side of the document to a user are shown in accordance with the document image.

According to the arrangement of the present invention, with the image processing apparatus for carrying out the rotation processing so that the first reference direction from the reference side of the document to the side facing the reference side coincides with the second direction of the document image which has been subjected to the rotation processing, it is possible to allow a user to recognize the reference side before the rotation processing is carried out. Therefore, before the rotation processing is carried out, the user can easily predict how the document shown in the document image will be oriented after the document image is subjected to the rotation processing.

Further, in the image processing apparatus of the present invention, in addition to the arrangement described above, the second reference direction is a direction from an upper part of the document image to a lower part of the document image. Because of this, the rotation processing causes, in the document image, the direction from the upper part of the document image to the lower part of the document image to be identical with the direction from the reference side of the document shown in the document image to the side facing the reference side. However, the second reference direction is not limited to the direction from the upper part of the document image to the lower part of the document image, and may be a direction from the lower part to the upper part.

Furthermore, in addition to the arrangement described above, the image processing apparatus of the present invention includes a top-to-bottom direction determining section for determining a top-to-bottom direction from a top side of the document shown in the document image to a bottom side of the document, wherein the display control section causes the display apparatus to display the display image in a case where the top-to-bottom direction and the second reference direction do not coincide with each other. With the arrangement, if the top-to-bottom direction of the document and the upper-to-lower direction (the direction from the upper part to the lower part) of the document image do not coincide with each other, the display image is automatically displayed. Therefore, it is possible to allow a user to recognize necessity of carrying out the rotation processing.

Moreover, in addition to the arrangement described above, in the image processing apparatus of the present invention, the first reference direction is the top-to-bottom direction. Therefore, it is possible to cause the top-to-bottom direction (the direction from the top side to the bottom side) of the document to be identical with the upper-to-lower direction of the document image.

Further, in the image processing apparatus of the present invention, in the display image, the mark and the document are preferably shown such that (i) the mark and the document overlap each other and (ii) the mark is in contact with the reference side. With the arrangement, the mark is arranged to be in contact with the reference side in the display image, so as to allow a user to easily recognize the reference side.

Furthermore, in the image processing apparatus of the present invention, the mark is a command button via which a command is entered, and the rotation processing section carries out the rotation processing in response to a command entered via the command button. With the arrangement, it becomes possible for a user to input a command to carry out the rotation processing by only selecting the mark. This allows user's operation to be more convenient.

Further, in the image processing apparatus of the present invention, a combination of the document and a mark indicating a reference side of the document is preferably shown in the display image at each settable rotation angle. With the arrangement, it becomes possible for a user to (i) look at orientations of documents that have been subjected to the rotation processing for the respective settable rotation angles, and (ii) easily predict a relationship between a rotation angle and an orientation of the documents that have been subjected to the rotation processing, before the rotation processing is carried out.

Furthermore, in the image processing apparatus of the present invention, the display control section may (i) carry out provisional rotation processing at rotation angle identical with that of the rotation processing carried out by the rotation processing section, with respect to a document image that has been downsampled, and (ii) cause a display apparatus to display, as the display image, an image in which a document shown in the downsampled document image that has been subjected to the provisional rotation processing, and a mark indicating a reference side of the document to a user are shown. With the arrangement, a user can check the display image obtained based on the provisional rotation processing carried out at the rotation angle identical with the rotation processing. Therefore, it becomes possible for a user to predict more realistically how the document shown in the document image will be oriented after the document image is subjected to the rotation processing.

Moreover, in the image processing apparatus of the present invention, in addition to the arrangements described above, (i) the top-to-bottom direction determining section may determine each top-to-bottom direction of a plurality of document images in a case of receiving data including the plurality of document images in which respective documents are shown, (ii) the display control section causes, for a combination of ones of the plurality of document images whose top-to-bottom directions coincide with each other, the display apparatus to display, as the display image, an image in which (a) each of the respective documents shown in said ones of the plurality of document images and (b) a mark indicating each reference side of the respective documents to the user are shown, (iii) in the display image, a selection button for a user to select a target document to be subjected to the rotation processing is shown, and (iv) the rotation processing section carries out collectively the rotation processing with respect to ones of the plurality of document images in which respective documents selected as target documents are shown, in response to a command to carry out rotation processing. With the arrangement, it becomes possible for a user to carry out collectively the rotation processing with respect to the document images selected by the user from among the plurality of document images whose top-to-bottom directions coincide with each other but do not coincide with the upper-to-lower direction of the document images.

Further, the present invention may be an image forming apparatus including said image processing apparatus. Furthermore, the present invention may be an image processing method including the steps of: carrying out rotation processing with respect to a document image, in which a document is shown, so that a first reference direction from a reference side of the document to a side facing the reference side coincides with a second reference direction of the document image which has been subjected to the rotation processing; and causing a display apparatus to display, before the rotation process is carried out, a display image in which the document, and a mark indicating the reference side to a user are shown in accordance with the document image.

Further, the image processing apparatus of the present invention may be realized by a computer. In this case, the present invention includes a control program for causing the computer to function as the rotation processing section and the display control section, and a computer-readable recording medium in which the program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An image processing apparatus of the present invention is suitable for an apparatus for processing image data read from a document. Further, the image processing apparatus can be applied to a multifunction printer, a copying machine, a scanning device, or a facsimile apparatus.

The invention claimed is:

1. An image processing apparatus comprising:
a rotation processing section for carrying out rotation processing with respect to a document image, in which a document is shown, so that a first reference direction from a reference side of the document to a side facing the reference side coincides with a second reference direction of the document image which has been subjected to the rotation processing;
a top-to-bottom direction determining section for determining a top-to-bottom direction from a top side of the document shown in the document image to a lower side of the document; and
a display control section for causing a display apparatus to display, before the rotation processing is carried out, a display image in which (i) the document, (ii) a mark indicating the reference side to a user, and (iii) a selection button for the user to select a target document to be subjected to the rotation processing are shown in accordance with the document image,
the top-to-bottom direction determining section determining each top-to-bottom direction of a plurality of document images in a case of receiving data including the plurality of document images in which respective documents are shown,
the display control section causing, for a combination of ones of the plurality of document images whose top-to-bottom directions coincide with each other, the display apparatus to display, as the display image, an image in which (i) each of the respective documents shown in said ones of the plurality of document images and (ii) a mark indicating each reference side of the respective documents to the user are shown,
the rotation processing section carrying out collectively rotation processing with respect to ones of the plurality of document images in which respective documents selected as target documents are shown, in response to a command to carry out rotation processing.

2. The image processing apparatus according to claim 1, wherein:
the second reference direction is a direction from an upper part of the document image to an lower part of the document image.

3. The image processing apparatus according to claim 1, wherein:
the display control section causes the display apparatus to display the display image in a case where the top-to-bottom direction and the second reference direction do not coincide with each other.

4. The image processing apparatus according to claim 1, wherein:
the reference side is the top side of the document, and the first reference direction is the top-to-bottom direction.

5. The image processing apparatus according to claim 1, wherein:
the mark and the document are shown in the display image such that (i) the mark and the document overlap each other, and (ii) the mark is in contact with the reference side.

6. The image processing apparatus according to claim 1, wherein:
the mark is a command button via which a command is entered, and
the rotation processing section carries out the rotation processing in response to a command entered via the command button.

7. The image processing apparatus according to claim 1, wherein:
the display control section (i) carries out, with respect to a downsampled image obtained by downsampling the document image, a provisional rotation processing at a rotation angle identical with that of the rotation processing carried out by the rotation processing section, and (ii) causes the display apparatus to display, as the display image, an image in which (a) a document shown in the downsampled image which has been subjected to the provisional rotation processing and (b) a mark indicating a reference side of the document to a user are shown.

8. An image forming apparatus comprising an image processing apparatus,
said image processing apparatus including:
a rotation processing section for carrying out rotation processing with respect to a document image, in which a document is shown, so that a first reference direction from a reference side of the document to a side facing the reference side coincides with a second reference direction of the document image which has been subjected to the rotation processing;
a top-to-bottom direction determining section for determining a top-to-bottom direction from a top side of the document shown in the document image to a lower side of the document; and
a display control section for causing a display apparatus to display, before the rotation processing is carried out, a display image in which (i) the document, (ii) a mark indicating the reference side to a user, and (iii) a selection button for the user to select a target document to be subjected to the rotation processing are shown in accordance with the document image,
the top-to-bottom direction determining section determining each top-to-bottom direction of a plurality of document images in a case of receiving data including the plurality of document images in which respective documents are shown,
the display control section causing, for a combination of ones of the plurality of document images whose top-to-bottom directions coincide with each other, the display apparatus to display, as the display image, an image in which (i) each of the respective documents shown in said ones of the plurality of document images and (ii) a mark indicating each reference side of the respective documents to the user are shown,
the rotation processing section carrying out collectively rotation processing with respect to ones of the plurality of document images in which respective documents selected as target documents are shown, in response to a command to carry out rotation processing.

9. An image processing method comprising the steps of:
(a) carrying out rotation processing with respect to a document image, in which a document is shown, so that a first reference direction from a reference side of the document to a side facing the reference side coincides with a second reference direction of the document image which has been subjected to the rotation processing;
(b) determining a top-to-bottom direction from a top side of the document shown in the document image to a lower side of the document; and
(c) causing a display apparatus to display, before the rotation processing is carried out, a display image in which (i) the document, (ii) a mark indicating the reference side to a user, and (iii) a selection button for the user to select a target document to be subjected to the rotation processing are shown in accordance with the document image,
the step (b) determining each top-to-bottom direction of a plurality of document images in a case of receiving data including the plurality of document images in which respective documents are shown,
the step (c) causing, for a combination of ones of the plurality of document images whose top-to-bottom directions coincide with each other, the display apparatus to display, as the display image, an image in which (i) each of the respective documents shown in said ones of the plurality of document images and (ii) a mark indicating each reference side of the respective documents to the user are shown,
the step (a) carrying out collectively rotation processing with respect to ones of the plurality of document images in which respective documents selected as target documents are shown, in response to a command to carry out rotation processing.

10. A non-transitory computer-readable storage medium for storing a control program causing a computer to function as each of the sections of an image processing apparatus recited in claim 1.

* * * * *